(12) United States Patent
Taylor et al.

(10) Patent No.: US 12,067,617 B1
(45) Date of Patent: Aug. 20, 2024

(54) CARD REGISTRY SYSTEMS AND METHODS

(71) Applicant: ConsumerInfo.com, Inc., Costa Mesa, CA (US)

(72) Inventors: Ty Taylor, Rancho Santa Margarita, CA (US); Michael R. Balducci, Aliso Viejo, CA (US); Arlene E. Miranda, Huntington Beach, CA (US); Laura Gelgand, Irvine, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 18/182,185

(22) Filed: Mar. 10, 2023

Related U.S. Application Data

(63) Continuation of application No. 17/830,980, filed on Jun. 2, 2022, now Pat. No. 11,631,130, which is a continuation of application No. 17/102,070, filed on Nov. 23, 2020, now Pat. No. 11,379,916, which is a continuation of application No. 16/839,457, filed on Apr. 3, 2020, now Pat. No. 10,878,499, which is a continuation of application No. 16/292,678, filed on
(Continued)

(51) Int. Cl.
- *G06Q 40/03* (2023.01)
- *G06Q 20/24* (2012.01)
- *G06Q 20/26* (2012.01)
- *G06Q 20/34* (2012.01)

(52) U.S. Cl.
CPC ............. *G06Q 40/03* (2023.01); *G06Q 20/24* (2013.01); *G06Q 20/26* (2013.01); *G06Q 20/354* (2013.01)

(58) Field of Classification Search
CPC ........ G06Q 40/03; G06Q 20/24; G06Q 20/26; G06Q 20/354
USPC .......................................................... 705/38
See application file for complete search history.

(56) References Cited

U.S. PATENT DOCUMENTS

| | | | |
|---|---|---|---|
| 3,405,457 | A | 10/1968 | Bitzer |
| 4,346,442 | A | 8/1982 | Musmanno |

(Continued)

FOREIGN PATENT DOCUMENTS

| | | |
|---|---|---|
| BR | 112013017973-2 | 10/2020 |
| CA | 2 509 842 | 12/2005 |

(Continued)

OTHER PUBLICATIONS

U.S. Appl. No. 12/705,489, filed Feb. 12, 2010, Bargoli et al..
(Continued)

*Primary Examiner* — Michael G Lee
*Assistant Examiner* — David Tardif
(74) *Attorney, Agent, or Firm* — Knobbe, Martens, Olson & Bear, LLP

(57) ABSTRACT

A card registry system is configured to automatically identify financial card information in one or more credit files associated with a consumer and populate a card registry account of the consumer with the identified financial card information. Once the financial card information has been obtained from the credit file(s), the card registry system may transmit cancellation and/or reissuance requests to the respective card issuers in the instance that one or more cards are compromised, so that the financial cards may be easily and efficiently cancelled and/or reissued at the request of the consumer.

19 Claims, 10 Drawing Sheets

Related U.S. Application Data

Mar. 5, 2019, now Pat. No. 10,614,519, which is a continuation of application No. 15/993,404, filed on May 30, 2018, now Pat. No. 10,262,364, which is a continuation of application No. 15/654,639, filed on Jul. 19, 2017, now Pat. No. 9,990,674, which is a continuation of application No. 15/393,110, filed on Dec. 28, 2016, now Pat. No. 9,767,513, which is a continuation of application No. 14/987,463, filed on Jan. 4, 2016, now Pat. No. 9,542,682, which is a continuation of application No. 13/919,898, filed on Jun. 17, 2013, now Pat. No. 9,230,283, which is a continuation of application No. 13/411,914, filed on Mar. 5, 2012, now Pat. No. 8,464,939, which is a continuation of application No. 12/334,278, filed on Dec. 12, 2008, now Pat. No. 8,127,986.

(60) Provisional application No. 61/013,877, filed on Dec. 14, 2007.

(56) References Cited

U.S. PATENT DOCUMENTS

| | | |
|---|---|---|
| 4,734,858 A | 3/1988 | Schlafly |
| 4,755,940 A | 7/1988 | Brachtl et al. |
| 4,774,664 A | 9/1988 | Campbell et al. |
| 4,827,508 A | 5/1989 | Shear |
| 4,891,503 A | 1/1990 | Jewell |
| 4,977,595 A | 12/1990 | Ohta et al. |
| 4,989,141 A | 1/1991 | Lyons et al. |
| 5,126,936 A | 6/1992 | Champion et al. |
| 5,148,365 A | 9/1992 | Dembo |
| 5,220,501 A | 6/1993 | Lawlor et al. |
| 5,262,941 A | 11/1993 | Saladin |
| 5,274,547 A | 12/1993 | Zoffel et al. |
| 5,336,870 A | 8/1994 | Hughes et al. |
| 5,351,186 A | 9/1994 | Bullock et al. |
| 5,361,201 A | 11/1994 | Jost et al. |
| 5,383,113 A | 1/1995 | Kight et al. |
| 5,404,518 A | 4/1995 | Gilbertson et al. |
| 5,423,033 A | 6/1995 | Yuen |
| 5,500,513 A | 3/1996 | Langhans et al. |
| 5,563,783 A | 10/1996 | Stolfo et al. |
| 5,590,038 A | 12/1996 | Pitroda |
| 5,592,560 A | 1/1997 | Deaton et al. |
| 5,621,201 A | 4/1997 | Langhans et al. |
| 5,640,577 A | 6/1997 | Scharmer |
| 5,649,114 A | 7/1997 | Deaton et al. |
| 5,649,115 A | 7/1997 | Schrader et al. |
| 5,659,725 A | 8/1997 | Levy et al. |
| 5,659,731 A | 8/1997 | Gustafson |
| 5,689,651 A | 11/1997 | Lozman |
| 5,692,107 A | 11/1997 | Simoudis et al. |
| 5,719,941 A | 2/1998 | Swift et al. |
| 5,729,735 A | 3/1998 | Meyering |
| 5,739,512 A | 4/1998 | Tognazzini |
| 5,742,769 A | 4/1998 | Lee et al. |
| 5,754,632 A | 5/1998 | Smith |
| 5,754,939 A | 5/1998 | Herz et al. |
| 5,774,870 A | 6/1998 | Storey |
| 5,809,322 A | 9/1998 | Akerib |
| 5,813,006 A | 9/1998 | Polnerow et al. |
| 5,819,234 A | 10/1998 | Slavin et al. |
| 5,822,751 A | 10/1998 | Gray et al. |
| 5,828,837 A | 10/1998 | Eikland |
| 5,832,068 A | 11/1998 | Smith |
| 5,842,211 A | 11/1998 | Horadan et al. |
| 5,844,218 A | 12/1998 | Kawan et al. |
| 5,857,174 A | 1/1999 | Dugan |
| 5,864,620 A | 1/1999 | Pettitt |
| 5,870,721 A | 2/1999 | Norris |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,918,227 A | 6/1999 | Polnerow et al. |
| 5,930,776 A | 7/1999 | Dykstra et al. |
| 5,933,837 A | 8/1999 | Kung |
| 5,937,392 A | 8/1999 | Alberts |
| 5,940,812 A | 8/1999 | Tengel et al. |
| 5,950,179 A | 9/1999 | Buchanan et al. |
| 5,953,710 A | 9/1999 | Fleming |
| 5,956,693 A | 9/1999 | Geerlings |
| 5,961,593 A | 10/1999 | Gabber et al. |
| 5,963,939 A | 10/1999 | McCann et al. |
| 5,966,695 A | 10/1999 | Melchione et al. |
| 5,970,478 A | 10/1999 | Walker et al. |
| 5,974,521 A | 10/1999 | Akerib |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,412 A | 12/1999 | Storey |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,035,288 A | 3/2000 | Solomon |
| 6,038,551 A | 3/2000 | Barlow et al. |
| 6,043,815 A | 3/2000 | Simonoff et al. |
| 6,055,570 A | 4/2000 | Nielsen |
| 6,064,990 A | 5/2000 | Goldsmith |
| 6,070,147 A | 5/2000 | Harms et al. |
| 6,072,894 A | 6/2000 | Payne |
| 6,073,140 A | 6/2000 | Morgan et al. |
| 6,076,070 A | 6/2000 | Stack |
| 6,085,242 A | 7/2000 | Chandra |
| 6,088,686 A | 7/2000 | Walker et al. |
| 6,108,691 A | 8/2000 | Lee et al. |
| 6,112,190 A | 8/2000 | Fletcher et al. |
| 6,115,694 A | 9/2000 | Cheetham et al. |
| 6,119,103 A | 9/2000 | Basch et al. |
| 6,128,602 A | 10/2000 | Northington et al. |
| 6,144,948 A | 11/2000 | Walker et al. |
| 6,145,088 A | 11/2000 | Stevens |
| 6,149,441 A | 11/2000 | Pellegrino et al. |
| 6,157,707 A | 12/2000 | Baulier et al. |
| 6,157,927 A | 12/2000 | Schaefer et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,195,660 B1 | 2/2001 | Polnerow et al. |
| 6,195,738 B1 | 2/2001 | Akerib |
| 6,199,077 B1 | 3/2001 | Inala et al. |
| 6,202,053 B1 | 3/2001 | Christiansen et al. |
| 6,202,067 B1 | 3/2001 | Blood et al. |
| 6,208,998 B1 | 3/2001 | Marcus |
| 6,230,188 B1 | 5/2001 | Marcus |
| 6,233,566 B1 | 5/2001 | Levine et al. |
| 6,233,588 B1 | 5/2001 | Marchoili et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,278,993 B1 | 8/2001 | Kumar et al. |
| 6,282,658 B2 | 8/2001 | French et al. |
| 6,289,452 B1 | 9/2001 | Arnold et al. |
| 6,295,528 B1 | 9/2001 | Marcus et al. |
| 6,295,541 B1 | 9/2001 | Bodnar et al. |
| 6,304,850 B1 | 10/2001 | Keller et al. |
| 6,304,860 B1 | 10/2001 | Martin et al. |
| 6,311,169 B2 | 10/2001 | Duhon |
| 6,317,783 B1 | 11/2001 | Freishtat et al. |
| 6,321,339 B1 | 11/2001 | French et al. |
| 6,327,578 B1 | 12/2001 | Linehan |
| 6,330,551 B1 | 12/2001 | Burchetta et al. |
| 6,343,279 B1 | 1/2002 | Bissonette et al. |
| 6,347,375 B1 | 2/2002 | Reinert et al. |
| 6,353,778 B1 | 3/2002 | Brown |

(56) References Cited

U.S. PATENT DOCUMENTS

| | | |
|---|---|---|
| 6,353,795 B1 | 3/2002 | Ranjan |
| 6,356,937 B1 | 3/2002 | Montville et al. |
| 6,374,230 B1 | 4/2002 | Walker et al. |
| 6,374,262 B1 | 4/2002 | Kodama |
| 6,384,844 B1 | 5/2002 | Stewart et al. |
| 6,386,444 B1 | 5/2002 | Sullivan |
| 6,393,406 B1 | 5/2002 | Eder |
| 6,397,197 B1 | 5/2002 | Gindlesperger |
| 6,397,212 B1 | 5/2002 | Biffar |
| 6,401,118 B1 | 6/2002 | Thomas |
| 6,405,173 B1 | 6/2002 | Honarvar |
| 6,405,181 B2 | 6/2002 | Lent et al. |
| 6,405,245 B1 | 6/2002 | Burson et al. |
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,422,462 B1 | 7/2002 | Cohen |
| 6,442,590 B1 | 8/2002 | Inala et al. |
| 6,446,200 B1 | 9/2002 | Ball et al. |
| 6,453,353 B1 | 9/2002 | Win et al. |
| 6,457,012 B1 | 9/2002 | Jatkowski |
| 6,460,127 B1 | 10/2002 | Akerib |
| 6,463,533 B1 | 10/2002 | Calamera et al. |
| 6,473,740 B2 | 10/2002 | Cockril et al. |
| 6,477,565 B1 | 11/2002 | Daswani et al. |
| 6,487,540 B1 | 11/2002 | Smith et al. |
| 6,496,936 B1 | 12/2002 | French et al. |
| 6,505,168 B1 | 1/2003 | Rothman et al. |
| 6,510,451 B2 | 1/2003 | Wu et al. |
| 6,517,587 B2 | 2/2003 | Satyavolu et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,549,904 B1 | 4/2003 | Ortega et al. |
| 6,552,670 B2 | 4/2003 | Sundaravel et al. |
| 6,564,210 B1 | 5/2003 | Korda et al. |
| 6,567,791 B2 | 5/2003 | Lent et al. |
| 6,567,850 B1 | 5/2003 | Freishtat et al. |
| 6,571,236 B1 | 5/2003 | Ruppelt |
| 6,574,736 B1 | 6/2003 | Andrews |
| 6,578,012 B1 | 6/2003 | Storey |
| 6,581,025 B2 | 6/2003 | Lehman |
| 6,587,841 B1 | 7/2003 | DeFrancesco |
| 6,594,766 B2 | 7/2003 | Rangan et al. |
| 6,601,173 B1 | 7/2003 | Mohler |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,633,910 B1 | 10/2003 | Rajan et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,694,353 B2 | 2/2004 | Sommerer |
| 6,701,348 B2 | 3/2004 | Sommerer |
| 6,703,930 B2 | 3/2004 | Skinner |
| 6,711,665 B1 | 3/2004 | Akerib et al. |
| 6,714,944 B1 | 3/2004 | Shapiro et al. |
| 6,718,313 B1 | 4/2004 | Lent et al. |
| 6,725,381 B1 | 4/2004 | Smith et al. |
| 6,725,425 B1 | 4/2004 | Rajan et al. |
| 6,738,804 B1 | 5/2004 | Lo |
| 6,745,196 B1 | 6/2004 | Colyer et al. |
| 6,745,938 B2 | 6/2004 | Sullivan |
| 6,748,426 B1 | 6/2004 | Shaffer et al. |
| 6,750,985 B2 | 6/2004 | Rhoads |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,781,608 B1 | 8/2004 | Crawford |
| 6,782,370 B1 | 8/2004 | Stack |
| 6,782,379 B2 | 8/2004 | Lee |
| 6,792,088 B2 | 9/2004 | Takeuchi |
| 6,792,263 B1 | 9/2004 | Kite |
| 6,795,812 B1 | 9/2004 | Lent et al. |
| 6,796,497 B2 | 9/2004 | Benkert et al. |
| 6,802,042 B2 | 10/2004 | Rangan et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,823,319 B1 | 11/2004 | Lynch et al. |
| 6,826,707 B1 | 11/2004 | Stevens |
| 6,829,639 B1 | 12/2004 | Lawson et al. |
| 6,842,782 B1 | 1/2005 | Malik et al. |
| 6,845,448 B1 | 1/2005 | Chaganti et al. |
| 6,847,966 B1 | 1/2005 | Sommer et al. |
| 6,847,974 B2 | 1/2005 | Wachtel |
| 6,850,918 B1 | 2/2005 | Burchetta et al. |
| 6,857,073 B2 | 2/2005 | French et al. |
| 6,859,212 B2 | 2/2005 | Kumar et al. |
| 6,865,680 B1 | 3/2005 | Wu et al. |
| 6,871,220 B1 | 3/2005 | Rajan et al. |
| 6,871,287 B1 | 3/2005 | Ellingson |
| 6,871,789 B2 | 3/2005 | Hilton et al. |
| 6,892,307 B1 | 5/2005 | Wood et al. |
| 6,898,574 B1 | 5/2005 | Regan |
| 6,900,731 B2 | 5/2005 | Kreiner et al. |
| 6,901,406 B2 | 5/2005 | Nabe et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,938,011 B1 | 8/2005 | Kemp et al. |
| 6,941,323 B1 | 9/2005 | Galperin |
| 6,947,989 B2 | 9/2005 | Gullotta et al. |
| 6,950,807 B2 | 9/2005 | Brock |
| 6,954,741 B1 | 10/2005 | Burchetta et al. |
| 6,954,757 B2 | 10/2005 | Zargham et al. |
| 6,957,336 B2 | 10/2005 | Wheeler et al. |
| 6,962,336 B2 | 11/2005 | Glass |
| 6,963,857 B1 | 11/2005 | Johnson |
| 6,965,881 B1 | 11/2005 | Brickell et al. |
| 6,968,319 B1 | 11/2005 | Remington et al. |
| 6,970,864 B2 | 11/2005 | Marcus et al. |
| 6,973,462 B2 | 12/2005 | Dattero et al. |
| 6,983,320 B1 | 1/2006 | Thomas et al. |
| 6,983,379 B1 | 1/2006 | Spalink et al. |
| 6,983,478 B1 | 1/2006 | Grauch et al. |
| 6,985,183 B2 | 1/2006 | Jan et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,510 B2 | 1/2006 | Guy |
| 6,993,572 B2 | 1/2006 | Ross, Jr. et al. |
| 6,993,596 B2 | 1/2006 | Hinton et al. |
| 6,996,542 B1 | 2/2006 | Landry |
| 6,999,941 B1 | 2/2006 | Agarwal |
| 7,013,310 B2 | 3/2006 | Messing et al. |
| 7,013,315 B1 | 3/2006 | Boothby |
| 7,013,323 B1 | 3/2006 | Thomas et al. |
| 7,016,907 B2 | 3/2006 | Boreham et al. |
| 7,024,548 B1 | 4/2006 | O'Toole, Jr. |
| 7,024,689 B2 | 4/2006 | O'Donnell et al. |
| 7,028,013 B2 | 4/2006 | Saeki |
| 7,028,052 B2 | 4/2006 | Chapman et al. |
| 7,035,855 B1 | 4/2006 | Kilger et al. |
| 7,039,607 B2 | 5/2006 | Watarai et al. |
| 7,039,656 B1 | 5/2006 | Tsai et al. |
| 7,043,476 B2 | 5/2006 | Robson |
| 7,046,139 B2 | 5/2006 | Kuhn et al. |
| 7,047,258 B2 | 5/2006 | Balogh et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |

(56) References Cited

U.S. PATENT DOCUMENTS

| | | |
|---|---|---|
| 7,065,526 B2 | 6/2006 | Wissner et al. |
| 7,065,566 B2 | 6/2006 | Menard et al. |
| 7,069,240 B2 | 6/2006 | Spero et al. |
| 7,072,909 B2 | 7/2006 | Polk |
| 7,076,462 B1 | 7/2006 | Nelson et al. |
| 7,076,475 B2 | 7/2006 | Honarvar et al. |
| 7,085,727 B2 | 8/2006 | VanOrman |
| 7,085,997 B1 | 8/2006 | Wu et al. |
| 7,086,586 B1 | 8/2006 | Sullivan |
| 7,089,594 B2 | 8/2006 | Lal et al. |
| 7,103,473 B2 | 9/2006 | Ranjan |
| 7,103,602 B2 | 9/2006 | Black et al. |
| 7,107,241 B1 | 9/2006 | Pinto |
| 7,107,285 B2 | 9/2006 | Von Kaenel et al. |
| 7,110,978 B1 | 9/2006 | Chin |
| 7,117,172 B1 | 10/2006 | Black |
| 7,117,529 B1 | 10/2006 | O'Donnell et al. |
| 7,124,144 B2 | 10/2006 | Christianson et al. |
| 7,127,068 B2 | 10/2006 | Sundaravel et al. |
| 7,127,424 B2 | 10/2006 | Kemp et al. |
| 7,133,935 B2 | 11/2006 | Hedy |
| 7,139,728 B2 | 11/2006 | Rigole |
| 7,143,063 B2 | 11/2006 | Lent |
| 7,149,782 B2 | 12/2006 | Sommerer |
| 7,155,508 B2 | 12/2006 | Sankuratripati et al. |
| 7,155,725 B1 | 12/2006 | Kister et al. |
| 7,155,739 B2 | 12/2006 | Bari et al. |
| 7,174,455 B1 | 2/2007 | Arnold et al. |
| 7,178,096 B2 | 2/2007 | Rangan et al. |
| 7,181,418 B1 | 2/2007 | Zucker et al. |
| 7,181,427 B1 | 2/2007 | DeFrancesco |
| 7,185,016 B1 | 2/2007 | Rasmussen |
| 7,194,416 B1 | 3/2007 | Provost et al. |
| 7,200,602 B2 | 4/2007 | Jonas |
| 7,200,804 B1 | 4/2007 | Khavari et al. |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,213,064 B2 | 5/2007 | Smith et al. |
| 7,218,912 B2 | 5/2007 | Erskine et al. |
| 7,219,107 B2 | 5/2007 | Beringer |
| 7,222,085 B2 | 5/2007 | Stack |
| 7,222,369 B2 | 5/2007 | Vering et al. |
| 7,225,464 B2 | 5/2007 | Satyavolu et al. |
| 7,228,289 B2 | 6/2007 | Brumfield et al. |
| 7,228,335 B2 | 6/2007 | Caughey |
| 7,229,006 B2 | 6/2007 | Babbi et al. |
| 7,234,156 B2 | 6/2007 | French et al. |
| 7,236,950 B2 | 6/2007 | Savage et al. |
| 7,240,363 B1 | 7/2007 | Ellingson |
| 7,243,369 B2 | 7/2007 | Bhat et al. |
| 7,246,361 B1 | 7/2007 | Scalora et al. |
| 7,246,740 B2 | 7/2007 | Swift et al. |
| 7,249,076 B1 | 7/2007 | Pendleton et al. |
| 7,249,080 B1 | 7/2007 | Hoffman et al. |
| 7,249,096 B1 | 7/2007 | Lasater et al. |
| 7,249,113 B1 | 7/2007 | Continelli et al. |
| 7,263,497 B1 | 8/2007 | Wiser et al. |
| 7,263,548 B2 | 8/2007 | Daswani et al. |
| 7,272,591 B1 | 9/2007 | Ghazal et al. |
| 7,280,980 B1 | 10/2007 | Hoadley et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,305,233 B2 | 12/2007 | Paul et al. |
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,831 B2 | 2/2008 | Biondi et al. |
| 7,330,835 B2 | 2/2008 | Deggendorf |
| 7,333,635 B2 | 2/2008 | Tsantes et al. |
| 7,334,020 B2 | 2/2008 | Caughey |
| 7,340,042 B2 | 3/2008 | Cluff et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,503 B1 | 4/2008 | Johnson et al. |
| 7,356,506 B2 | 4/2008 | Watson et al. |
| 7,356,516 B2 | 4/2008 | Richey et al. |
| 7,366,495 B1 | 4/2008 | Magnotta et al. |
| 7,366,694 B2 | 4/2008 | Lazerson |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,379,978 B2 | 5/2008 | Anderson et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,241 B1 | 7/2008 | Cook et al. |
| 7,395,243 B1 | 7/2008 | Zielke et al. |
| 7,395,273 B2 | 7/2008 | Khan et al. |
| 7,400,883 B2 | 7/2008 | Rivers et al. |
| 7,401,050 B2 | 7/2008 | O'Neill |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,412,487 B2 | 8/2008 | Caughey |
| 7,413,113 B1 | 8/2008 | Zhu |
| 7,424,520 B2 | 9/2008 | Daswani et al. |
| 7,430,520 B1 | 9/2008 | Haugen et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,447,663 B1 | 11/2008 | Barker et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,483,892 B1 | 1/2009 | Sommer et al. |
| 7,490,356 B2 | 2/2009 | Lieblich et al. |
| RE40,692 E | 3/2009 | Rose, Jr. |
| 7,503,489 B2 | 3/2009 | Heffez |
| 7,505,931 B2 | 3/2009 | Silva |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,536,354 B1 | 5/2009 | deGroeve et al. |
| 7,542,468 B1 | 6/2009 | Begley et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,190 B1 | 6/2009 | Freishtat et al. |
| 7,552,467 B2 | 6/2009 | Lindsay |
| 7,555,459 B2 | 6/2009 | Dhar et al. |
| 7,558,748 B2 | 7/2009 | Ehring et al. |
| 7,558,777 B1 | 7/2009 | Santos |
| 7,558,795 B2 | 7/2009 | Malik et al. |
| 7,559,217 B2 | 7/2009 | Bass |

(56) References Cited

U.S. PATENT DOCUMENTS

| | | |
|---|---|---|
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,322 B2 | 8/2009 | Karoubi |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,583,682 B2 | 9/2009 | Hopkins |
| 7,584,126 B1 | 9/2009 | White |
| 7,584,146 B1 | 9/2009 | Duhon |
| 7,587,368 B2 | 9/2009 | Felsher |
| 7,593,891 B2 | 9/2009 | Kornegay et al. |
| 7,594,019 B2 | 9/2009 | Clapper |
| 7,596,716 B2 | 9/2009 | Frost et al. |
| 7,606,752 B2 | 10/2009 | Hazlehurst et al. |
| 7,610,216 B1 | 10/2009 | May et al. |
| 7,610,229 B1 | 10/2009 | Kornegay |
| 7,613,600 B2 | 11/2009 | Krane |
| 7,620,596 B2 | 11/2009 | Knudson et al. |
| 7,620,602 B2 | 11/2009 | Jakstadt et al. |
| 7,620,653 B1 | 11/2009 | Swartz |
| 7,623,844 B2 | 11/2009 | Herrmann et al. |
| 7,624,433 B1 | 11/2009 | Clark et al. |
| 7,630,903 B1 | 12/2009 | Vaidyanathan |
| 7,630,932 B2 | 12/2009 | Danaher et al. |
| 7,630,933 B2 | 12/2009 | Peterson et al. |
| 7,631,803 B2 | 12/2009 | Peyret et al. |
| 7,634,651 B1 | 12/2009 | Gerde et al. |
| 7,634,737 B2 | 12/2009 | Beringer et al. |
| 7,636,686 B2 | 12/2009 | Pierdinock et al. |
| 7,640,200 B2 | 12/2009 | Gardner et al. |
| 7,640,209 B1 | 12/2009 | Brooks et al. |
| 7,644,023 B2 | 1/2010 | Kumar et al. |
| 7,644,035 B1 | 1/2010 | Biffle et al. |
| 7,644,285 B1 | 1/2010 | Murray et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,613 B1 | 1/2010 | DeGraaff et al. |
| 7,653,688 B2 | 1/2010 | Bittner |
| 7,664,725 B2 | 2/2010 | Murray et al. |
| 7,665,657 B2 | 2/2010 | Huh |
| 7,672,833 B2 | 3/2010 | Blume et al. |
| 7,672,865 B2 | 3/2010 | Kumar et al. |
| 7,672,879 B1 | 3/2010 | Kumar et al. |
| 7,672,924 B1 | 3/2010 | Scheurich et al. |
| 7,672,926 B2 | 3/2010 | Ghazal et al. |
| 7,672,944 B1 | 3/2010 | Holladay et al. |
| 7,676,410 B2 | 3/2010 | Petralia |
| 7,676,463 B2 | 3/2010 | Thompson et al. |
| 7,680,772 B2 | 3/2010 | Kronberg |
| 7,685,209 B1 | 3/2010 | Norton et al. |
| 7,685,525 B2 | 3/2010 | Kumar et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,697,520 B2 | 4/2010 | Hopkins |
| 7,698,214 B1 | 4/2010 | Lindgren |
| 7,698,217 B1 | 4/2010 | Phillips et al. |
| 7,702,576 B2 | 4/2010 | Fahner et al. |
| 7,707,117 B1 | 4/2010 | Jimenez et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,626 B2 | 5/2010 | Nanjundamoorthy et al. |
| 7,711,635 B2 | 5/2010 | Steele et al. |
| 7,711,707 B2 | 5/2010 | Kelley |
| 7,715,832 B2 | 5/2010 | Zhou |
| 7,720,705 B2 | 5/2010 | Stein |
| 7,720,750 B2 | 5/2010 | Brody |
| 7,720,846 B1 | 5/2010 | Bayliss |
| 7,725,385 B2 | 5/2010 | Royer et al. |
| 7,729,283 B2 | 6/2010 | Ferguson et al. |
| 7,729,959 B1 | 6/2010 | Wells et al. |
| 7,729,969 B1 | 6/2010 | Smith, III et al. |
| 7,730,078 B2 | 6/2010 | Schwabe et al. |
| 7,734,522 B2 | 6/2010 | Johnson et al. |
| 7,734,541 B2 | 6/2010 | Kumar et al. |
| 7,734,637 B2 | 6/2010 | Greifeneder et al. |
| 7,739,193 B2 | 6/2010 | Zimmer et al. |
| 7,739,707 B2 | 6/2010 | Sie et al. |
| 7,747,520 B2 | 6/2010 | Livermore et al. |
| 7,747,521 B2 | 6/2010 | Serio |
| 7,752,179 B1 | 7/2010 | Brown |
| 7,752,236 B2 | 7/2010 | Williams et al. |
| 7,752,286 B2 | 7/2010 | Anderson et al. |
| 7,756,789 B2 | 7/2010 | Welker et al. |
| 7,757,944 B2 | 7/2010 | Cline et al. |
| 7,761,373 B2 | 7/2010 | Metz |
| 7,761,384 B2 | 7/2010 | Madhogarhia |
| 7,761,569 B2 | 7/2010 | Hopkins |
| 7,765,148 B2 | 7/2010 | German et al. |
| 7,765,166 B2 | 7/2010 | Beringer et al. |
| 7,765,279 B1 | 7/2010 | Kaib et al. |
| 7,765,525 B1 | 7/2010 | Davidson et al. |
| 7,769,697 B2 | 8/2010 | Fieschi et al. |
| 7,769,998 B2 | 8/2010 | Lynch et al. |
| 7,770,002 B2 | 8/2010 | Weber |
| 7,774,257 B2 | 8/2010 | Maggioncalda et al. |
| 7,774,270 B1 | 8/2010 | MacCloskey |
| 7,778,868 B2 | 8/2010 | Haugen et al. |
| 7,783,515 B1 | 8/2010 | Kumar et al. |
| 7,783,749 B2 | 8/2010 | Hopkins |
| 7,787,869 B2 | 8/2010 | Rice et al. |
| 7,788,040 B2 | 8/2010 | Haskell et al. |
| 7,792,715 B1 | 9/2010 | Kasower |
| 7,792,725 B2 | 9/2010 | Booraem et al. |
| 7,792,747 B2 | 9/2010 | Chin |
| 7,792,903 B2 | 9/2010 | Fischer et al. |
| 7,793,835 B1 | 9/2010 | Coggeshall et al. |
| 7,797,224 B2 | 9/2010 | Barone et al. |
| 7,797,252 B2 | 9/2010 | Rosskamm et al. |
| 7,797,644 B1 | 9/2010 | Bhojan |
| 7,797,734 B2 | 9/2010 | Babi et al. |
| 7,801,807 B2 | 9/2010 | DeFrancesco et al. |
| 7,801,811 B1 | 9/2010 | Merrell et al. |
| 7,801,828 B2 | 9/2010 | Candella et al. |
| 7,801,896 B2 | 9/2010 | Szabo |
| 7,801,956 B1 | 9/2010 | Cumberbatch et al. |
| 7,802,104 B2 | 9/2010 | Dickinson |
| 7,805,348 B2 | 9/2010 | Nanjundamoorthy et al. |
| 7,805,362 B1 | 9/2010 | Merrell et al. |
| 7,805,439 B2 | 9/2010 | Elliott et al. |
| 7,809,398 B2 | 10/2010 | Pearson |
| 7,809,624 B1 | 10/2010 | Smith, III et al. |
| 7,809,797 B2 | 10/2010 | Cooley et al. |
| 7,810,036 B2 | 10/2010 | Bales et al. |
| 7,814,002 B2 | 10/2010 | DeFrancesco et al. |
| 7,814,005 B2 | 10/2010 | Imrey et al. |
| 7,814,431 B1 | 10/2010 | Quinn et al. |
| 7,818,228 B1 | 10/2010 | Coulter |
| 7,818,229 B2 | 10/2010 | Imrey et al. |
| 7,818,382 B2 | 10/2010 | Sommerer |
| 7,822,624 B2 | 10/2010 | Erdmann et al. |
| 7,822,667 B1 | 10/2010 | Smith, III et al. |
| 7,827,108 B2 | 11/2010 | Perlman et al. |
| 7,827,115 B2 | 11/2010 | Weller et al. |
| 7,831,609 B1 | 11/2010 | Alexander |
| 7,832,006 B2 | 11/2010 | Chen et al. |
| 7,835,983 B2 | 11/2010 | Lefner et al. |
| 7,835,990 B2 | 11/2010 | Coleman |
| 7,840,484 B2 | 11/2010 | Haggerty et al. |
| 7,840,597 B2 | 11/2010 | Showalter et al. |
| 7,840,674 B1 | 11/2010 | Sterling |

(56) References Cited

U.S. PATENT DOCUMENTS

| | | |
|---|---|---|
| 7,841,004 B1 * | 11/2010 | Balducci .............. G06Q 40/02 455/410 |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,849,397 B1 | 12/2010 | Ahmed |
| 7,853,493 B2 * | 12/2010 | DeBie .................. G06Q 40/12 705/30 |
| 7,853,522 B2 | 12/2010 | Chin |
| 7,856,203 B2 | 12/2010 | Lipovski |
| 7,856,376 B2 | 12/2010 | Storey |
| 7,856,386 B2 | 12/2010 | Hazlehurst et al. |
| 7,856,453 B2 | 12/2010 | Malik et al. |
| 7,860,769 B2 | 12/2010 | Benson |
| 7,860,790 B2 | 12/2010 | Monk |
| 7,865,412 B1 | 1/2011 | Weiss et al. |
| 7,866,548 B2 | 1/2011 | Reed et al. |
| 7,870,066 B2 | 1/2011 | Lin et al. |
| 7,870,068 B2 | 1/2011 | Chin |
| 7,870,078 B2 | 1/2011 | Clark et al. |
| 7,870,485 B2 | 1/2011 | Seliutin et al. |
| 7,870,491 B1 | 1/2011 | Henderson et al. |
| 7,873,563 B2 | 1/2011 | Barone et al. |
| 7,873,573 B2 | 1/2011 | Realini |
| 7,873,677 B2 | 1/2011 | Messing et al. |
| 7,877,304 B1 | 1/2011 | Coulter |
| 7,877,402 B1 | 1/2011 | Weiss et al. |
| 7,877,784 B2 | 1/2011 | Chow et al. |
| 7,880,728 B2 | 2/2011 | de los Reyes et al. |
| 7,890,403 B1 | 2/2011 | Smith |
| 7,895,227 B1 | 2/2011 | Henderson |
| 7,899,750 B1 | 3/2011 | Klieman et al. |
| 7,899,757 B1 | 3/2011 | Talan et al. |
| 7,904,447 B1 | 3/2011 | Russell et al. |
| 7,904,899 B2 | 3/2011 | Robalewski et al. |
| 7,908,242 B1 | 3/2011 | Achanta |
| 7,909,246 B2 | 3/2011 | Hogg et al. |
| 7,911,673 B2 | 3/2011 | Yap |
| 7,912,778 B2 | 3/2011 | Nanjundamoorthy |
| 7,912,842 B1 | 3/2011 | Bayliss et al. |
| 7,912,865 B2 | 3/2011 | Akerman et al. |
| 7,913,173 B2 | 3/2011 | Hebard et al. |
| 7,917,412 B1 | 3/2011 | Wang et al. |
| 7,917,754 B1 | 3/2011 | Harrison et al. |
| 7,925,285 B2 | 4/2011 | Indirabhai |
| 7,925,582 B1 | 4/2011 | Kornegay et al. |
| 7,925,982 B2 | 4/2011 | Parker |
| 7,930,239 B2 | 4/2011 | Pierdinock et al. |
| 7,930,285 B2 | 4/2011 | Abraham et al. |
| 7,930,302 B2 | 4/2011 | Bandaru et al. |
| 7,930,411 B1 | 4/2011 | Hayward |
| 7,933,834 B2 | 4/2011 | Kumar et al. |
| 7,937,325 B2 | 5/2011 | Kumar et al. |
| 7,941,560 B1 | 5/2011 | Friesen et al. |
| 7,953,213 B2 | 5/2011 | Babi et al. |
| 7,954,698 B1 | 6/2011 | Pliha |
| 7,958,046 B2 | 6/2011 | Doerner et al. |
| 7,962,361 B2 | 6/2011 | Ramchandani et al. |
| 7,965,275 B1 | 6/2011 | Lew |
| 7,966,192 B2 | 6/2011 | Pagliari et al. |
| 7,966,325 B2 | 6/2011 | Singh |
| 7,970,676 B2 | 6/2011 | Feinstein |
| 7,970,679 B2 | 6/2011 | Kasower |
| 7,970,698 B2 | 6/2011 | Gupta et al. |
| 7,970,701 B2 | 6/2011 | Lewis et al. |
| 7,970,796 B1 | 6/2011 | Narayanan |
| 7,971,141 B1 | 6/2011 | Quinn et al. |
| 7,975,299 B1 | 7/2011 | Balducci et al. |
| 7,979,908 B2 | 7/2011 | Millwee |
| 7,983,932 B2 | 7/2011 | Kane |
| 7,983,979 B2 | 7/2011 | Holland, IV |
| 7,984,436 B1 | 7/2011 | Murray |
| 7,987,173 B2 | 7/2011 | Alexander |
| 7,987,501 B2 | 7/2011 | Miller et al. |
| 7,990,895 B2 | 8/2011 | Ferguson et al. |
| 7,991,673 B2 | 8/2011 | Kumar et al. |
| 7,991,688 B2 | 8/2011 | Phelan et al. |
| 7,991,689 B1 | 8/2011 | Brunzell et al. |
| 8,001,041 B2 | 8/2011 | Hoadley et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,001,235 B2 | 8/2011 | Russ et al. |
| 8,001,582 B2 | 8/2011 | Hulten et al. |
| 8,005,755 B2 | 8/2011 | Freishtat et al. |
| 8,006,261 B1 | 8/2011 | Haberman et al. |
| 8,010,422 B1 | 8/2011 | Lascelles et al. |
| 8,010,674 B2 | 8/2011 | Fong |
| 8,014,756 B1 | 9/2011 | Henderson |
| 8,015,083 B1 | 9/2011 | Sterling et al. |
| 8,015,107 B2 | 9/2011 | Kornegay et al. |
| 8,019,066 B1 | 9/2011 | Efrati et al. |
| 8,024,660 B1 | 9/2011 | Quinn et al. |
| 8,027,975 B2 | 9/2011 | Gabriel et al. |
| 8,032,822 B1 | 10/2011 | Artamonov et al. |
| 8,032,930 B2 | 10/2011 | Hicks |
| 8,032,932 B2 | 10/2011 | Speyer et al. |
| 8,036,941 B2 | 10/2011 | Bennett et al. |
| 8,037,097 B2 | 10/2011 | Guo et al. |
| 8,037,115 B1 | 10/2011 | Scalora et al. |
| 8,037,176 B2 | 10/2011 | Hopkins |
| 8,041,127 B2 | 10/2011 | Whitelaw |
| 8,051,074 B2 | 11/2011 | Eom et al. |
| 8,055,904 B1 | 11/2011 | Cato et al. |
| 8,060,404 B2 | 11/2011 | Storey |
| 8,060,424 B2 | 11/2011 | Kasower |
| 8,060,438 B2 | 11/2011 | Dhar et al. |
| 8,060,508 B2 | 11/2011 | Gabriel et al. |
| 8,060,532 B2 | 11/2011 | White et al. |
| 8,060,916 B2 | 11/2011 | Bajaj et al. |
| 8,065,175 B1 | 11/2011 | Lewis |
| 8,065,233 B2 | 11/2011 | Lee et al. |
| 8,065,367 B1 | 11/2011 | Stanley |
| 8,069,213 B2 | 11/2011 | Bloch et al. |
| 8,069,407 B1 | 11/2011 | Armandpour et al. |
| 8,073,785 B1 | 12/2011 | Candella et al. |
| 8,078,453 B2 | 12/2011 | Shaw |
| 8,078,516 B1 | 12/2011 | Weiss et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,078,986 B1 | 12/2011 | Rhyne et al. |
| 8,086,508 B2 | 12/2011 | Dheer et al. |
| 8,086,525 B2 | 12/2011 | Atwood et al. |
| 8,090,794 B1 | 1/2012 | Kilat et al. |
| 8,095,443 B2 | 1/2012 | DeBie |
| 8,095,458 B2 | 1/2012 | Peterson et al. |
| 8,095,534 B1 | 1/2012 | Alexander |
| 8,095,614 B2 | 1/2012 | Hopkins |
| 8,098,239 B1 | 1/2012 | Moore |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,103,587 B2 | 1/2012 | Kumar et al. |
| 8,104,671 B2 | 1/2012 | Besecker et al. |
| 8,104,679 B2 | 1/2012 | Brown |
| 8,108,301 B2 | 1/2012 | Gupta et al. |
| 8,117,648 B2 | 2/2012 | Slaton et al. |
| 8,122,133 B2 | 2/2012 | Hopkins |
| 8,126,456 B2 | 2/2012 | Lotter et al. |
| 8,126,820 B1 | 2/2012 | Talan et al. |
| 8,127,982 B1 | 3/2012 | Casey et al. |
| 8,127,986 B1 | 3/2012 | Taylor et al. |
| 8,130,075 B1 | 3/2012 | Hingole |
| 8,131,598 B2 | 3/2012 | Goolkasian et al. |
| 8,131,685 B1 | 3/2012 | Gedalius et al. |
| 8,131,777 B2 | 3/2012 | McCullouch |
| 8,131,846 B1 | 3/2012 | Hernacki et al. |
| 8,140,847 B1 | 3/2012 | Wu |

(56) References Cited

U.S. PATENT DOCUMENTS

| | | |
|---|---|---|
| 8,145,189 B2 | 3/2012 | Power et al. |
| 8,145,554 B2 | 3/2012 | Kumar et al. |
| 8,150,161 B2 | 4/2012 | Laaser et al. |
| 8,151,343 B1 | 4/2012 | Wang et al. |
| 8,151,344 B1 | 4/2012 | Channakeshava |
| 8,155,950 B1 | 4/2012 | Bickerstaff |
| 8,156,175 B2 | 4/2012 | Hopkins |
| 8,160,624 B2 | 4/2012 | Kumar et al. |
| 8,160,960 B1 | 4/2012 | Fei et al. |
| 8,171,471 B1 | 5/2012 | Daly |
| 8,175,889 B1 | 5/2012 | Girulat et al. |
| 8,194,956 B2 | 6/2012 | Chandler |
| 8,195,549 B2 | 6/2012 | Kasower |
| 8,196,113 B2 | 6/2012 | Miller et al. |
| 8,200,966 B2 | 6/2012 | Grinberg et al. |
| 8,201,257 B1 | 6/2012 | Andres et al. |
| 8,204,812 B2 | 6/2012 | Stewart et al. |
| 8,209,659 B2 | 6/2012 | Mathew |
| 8,219,473 B2 | 7/2012 | Gardner et al. |
| 8,219,771 B2 | 7/2012 | Le Neel |
| 8,224,723 B2 | 7/2012 | Bosch et al. |
| 8,224,747 B2 | 7/2012 | Kumar et al. |
| 8,224,974 B1 | 7/2012 | Flora et al. |
| 8,225,270 B2 | 7/2012 | Frasher et al. |
| 8,225,288 B2 | 7/2012 | Miller et al. |
| 8,225,383 B1 | 7/2012 | Channakeshava et al. |
| 8,225,395 B2 | 7/2012 | Atwood et al. |
| 8,229,850 B2 | 7/2012 | Dilip et al. |
| 8,229,911 B2 | 7/2012 | Bennett |
| 8,234,498 B2 | 7/2012 | Britti et al. |
| 8,244,635 B2 | 8/2012 | Freishtat et al. |
| 8,244,646 B2 | 8/2012 | Johnston et al. |
| 8,244,848 B1 | 8/2012 | Narayanan et al. |
| 8,249,965 B2 | 8/2012 | Tumminaro |
| 8,249,968 B1 | 8/2012 | Oldham et al. |
| 8,255,298 B1 | 8/2012 | Nesladek |
| 8,255,868 B1 | 8/2012 | Robalewski |
| 8,255,978 B2 | 8/2012 | Dick |
| 8,256,013 B1 | 8/2012 | Hernacki et al. |
| 8,260,649 B2 | 9/2012 | Ramanujan et al. |
| 8,260,699 B2 | 9/2012 | Smith et al. |
| 8,260,805 B1 | 9/2012 | Venu et al. |
| 8,261,204 B1 | 9/2012 | Huynh et al. |
| 8,261,334 B2 | 9/2012 | Hazlehurst et al. |
| 8,261,974 B2 | 9/2012 | Hull |
| 8,266,065 B2 | 9/2012 | Dilip et al. |
| 8,266,515 B2 | 9/2012 | Satyavolu |
| 8,271,362 B2 | 9/2012 | Fasching |
| 8,271,393 B2 | 9/2012 | Twining et al. |
| 8,271,650 B2 | 9/2012 | Alexander |
| 8,271,894 B1 | 9/2012 | Mayers |
| 8,271,899 B1 | 9/2012 | Blackburn et al. |
| 8,271,906 B1 | 9/2012 | Fong |
| 8,271,961 B1 | 9/2012 | Chithambaram |
| 8,275,683 B2 | 9/2012 | Wolfson et al. |
| 8,280,723 B1 | 10/2012 | Laaser |
| 8,280,879 B2 | 10/2012 | Alexander |
| 8,281,372 B1 | 10/2012 | Vidal |
| 8,285,613 B1 | 10/2012 | Coulter |
| 8,285,640 B2 | 10/2012 | Scipioni |
| 8,285,641 B2 | 10/2012 | Cataline et al. |
| 8,285,656 B1 | 10/2012 | Chang et al. |
| 8,290,835 B2 | 10/2012 | Homer et al. |
| 8,290,840 B2 | 10/2012 | Kasower |
| 8,290,845 B2 | 10/2012 | Leibon et al. |
| 8,290,856 B1 | 10/2012 | Kasower |
| 8,290,941 B2 | 10/2012 | Alexander |
| 8,296,206 B1 | 10/2012 | Del Favero et al. |
| 8,296,229 B1 | 10/2012 | Yellin et al. |
| 8,306,255 B1 | 11/2012 | Degnan |
| 8,306,889 B2 | 11/2012 | Leibon et al. |
| 8,311,792 B1 | 11/2012 | Podgorny et al. |
| 8,312,033 B1 | 11/2012 | McMillan |
| 8,320,944 B1 | 11/2012 | Gibson et al. |
| 8,321,339 B2 | 11/2012 | Imrey et al. |
| 8,321,413 B2 | 11/2012 | Gabriel et al. |
| 8,324,080 B2 | 12/2012 | Yang et al. |
| 8,326,725 B2 | 12/2012 | Elwell et al. |
| 8,327,429 B2 | 12/2012 | Speyer et al. |
| 8,335,741 B2 | 12/2012 | Kornegay et al. |
| 8,341,545 B2 | 12/2012 | Hebard |
| 8,346,226 B2 | 1/2013 | Gibson et al. |
| 8,346,615 B2 | 1/2013 | Connors et al. |
| 8,347,364 B2 | 1/2013 | Babi et al. |
| 8,352,564 B1 | 1/2013 | Campise et al. |
| 8,353,027 B2 | 1/2013 | Dennis et al. |
| 8,353,029 B2 | 1/2013 | Morgan et al. |
| 8,355,935 B2 | 1/2013 | Hellman et al. |
| 8,355,967 B2 | 1/2013 | Debie et al. |
| 8,359,278 B2 | 1/2013 | Domenikos et al. |
| 8,364,662 B1 | 1/2013 | Moyer et al. |
| 8,364,969 B2 | 1/2013 | King |
| 8,370,340 B1 | 2/2013 | Yu et al. |
| 8,374,885 B2 | 2/2013 | Stibel et al. |
| 8,374,973 B2 | 2/2013 | Herbrich et al. |
| 8,375,331 B1 | 2/2013 | Mayers |
| 8,380,803 B1 | 2/2013 | Stibel et al. |
| 8,381,120 B2 | 2/2013 | Stibel et al. |
| 8,386,966 B1 | 2/2013 | Attinasi et al. |
| 8,392,230 B2 | 3/2013 | Stibel et al. |
| 8,392,969 B1 | 3/2013 | Park et al. |
| 8,396,743 B2 | 3/2013 | Alvin |
| 8,396,747 B2 | 3/2013 | Bachenheimer |
| 8,400,970 B2 | 3/2013 | Bajar et al. |
| 8,401,875 B2 | 3/2013 | Fish et al. |
| 8,402,526 B2 | 3/2013 | Ahn |
| 8,407,141 B2 | 3/2013 | Mullen et al. |
| 8,407,194 B1 | 3/2013 | Chaput et al. |
| 8,412,593 B1 | 4/2013 | Song et al. |
| 8,413,239 B2 | 4/2013 | Sutton et al. |
| 8,417,644 B2 | 4/2013 | Ferguson et al. |
| 8,423,285 B2 | 4/2013 | Paterson et al. |
| 8,429,073 B2 | 4/2013 | Ferguson et al. |
| 8,432,275 B2 | 4/2013 | Patel et al. |
| 8,433,654 B2 | 4/2013 | Subbarao et al. |
| 8,443,202 B2 | 5/2013 | White et al. |
| 8,453,068 B2 | 5/2013 | Stibel et al. |
| 8,453,218 B2 | 5/2013 | Lan et al. |
| 8,456,293 B1 | 6/2013 | Trundle et al. |
| 8,458,062 B2 | 6/2013 | Dutt et al. |
| 8,463,595 B1 | 6/2013 | Rehling et al. |
| 8,463,939 B1 | 6/2013 | Galvin |
| 8,464,939 B1 | 6/2013 | Taylor et al. |
| 8,468,028 B2 | 6/2013 | Stibel et al. |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,489,480 B2 | 7/2013 | Kassir |
| 8,490,197 B2 | 7/2013 | Herz |
| 8,494,973 B1 | 7/2013 | Dignan et al. |
| 8,498,914 B2 | 7/2013 | Hazelhurst |
| 8,498,944 B2 | 7/2013 | Solomon |
| 8,499,348 B1 | 7/2013 | Rubin |
| 8,504,470 B1 | 8/2013 | Chirehdast |
| 8,515,828 B1 | 8/2013 | Wolf et al. |
| 8,515,844 B2 | 8/2013 | Kasower |
| 8,527,357 B2 | 9/2013 | Ganesan |
| 8,527,596 B2 | 9/2013 | Long et al. |
| 8,533,118 B2 | 9/2013 | Weller et al. |
| 8,539,599 B2 | 9/2013 | Gomez et al. |
| 8,543,498 B2 | 9/2013 | Silbernagel et al. |
| 8,544,091 B2 | 9/2013 | Stibel |
| 8,548,903 B2 | 10/2013 | Becker |
| 8,554,584 B2 | 10/2013 | Hargroder |
| 8,555,357 B1 | 10/2013 | Gauvin |
| 8,560,161 B1 | 10/2013 | Kator et al. |
| 8,560,436 B2 | 10/2013 | Ingram et al. |
| 8,560,438 B2 | 10/2013 | Hankey et al. |
| 8,560,444 B2 | 10/2013 | Rosenblatt et al. |
| 8,560,447 B1 | 10/2013 | Hinghole et al. |
| 8,566,187 B2 | 10/2013 | Keld et al. |
| 8,572,083 B1 | 10/2013 | Snell et al. |
| 8,578,036 B1 | 11/2013 | Holfelder et al. |
| 8,578,496 B1 | 11/2013 | Krishnappa |

(56) References Cited

U.S. PATENT DOCUMENTS

| | | |
|---|---|---|
| 8,595,101 B1 | 11/2013 | Daukas et al. |
| 8,600,768 B2 | 12/2013 | Stibel et al. |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,606,869 B2 | 12/2013 | Stibel et al. |
| 8,626,137 B1 | 1/2014 | Devitt et al. |
| 8,626,637 B1 | 1/2014 | Gooch et al. |
| 8,630,893 B2 | 1/2014 | Stibel et al. |
| 8,630,938 B2 | 1/2014 | Cheng et al. |
| 8,639,930 B2 | 1/2014 | Stibel et al. |
| 8,646,051 B2 | 2/2014 | Paden et al. |
| 8,650,189 B2 | 2/2014 | Fertik et al. |
| 8,660,541 B1 | 2/2014 | Beresniewicz et al. |
| 8,660,919 B2 | 2/2014 | Kasower |
| 8,671,115 B2 | 3/2014 | Skurtovich, Jr. et al. |
| 8,676,684 B2 | 3/2014 | Newman et al. |
| 8,688,543 B2 | 4/2014 | Dominquez |
| 8,689,001 B1 | 4/2014 | Satish |
| 8,694,420 B1 | 4/2014 | Oliai |
| 8,705,718 B2 | 4/2014 | Baniak et al. |
| 8,706,599 B1 | 4/2014 | Koenig et al. |
| 8,706,616 B1 | 4/2014 | Flynn |
| 8,712,789 B2 | 4/2014 | Stibel et al. |
| 8,712,907 B1 | 4/2014 | Stibel et al. |
| 8,713,651 B1 | 4/2014 | Stibel |
| 8,725,605 B1 | 5/2014 | Plunkett |
| 8,725,613 B1 | 5/2014 | Celka et al. |
| 8,732,004 B1 | 5/2014 | Ramos et al. |
| 8,732,803 B2 | 5/2014 | Stibel et al. |
| 8,738,449 B1 | 5/2014 | Cupps et al. |
| 8,738,516 B1 | 5/2014 | Dean et al. |
| 8,745,698 B1 | 6/2014 | Ashfield et al. |
| 8,751,378 B2 | 6/2014 | Dornhelm et al. |
| 8,768,914 B2 | 7/2014 | Scriffignano et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,819,789 B2 | 8/2014 | Orttung et al. |
| 8,825,544 B2 | 9/2014 | Imrey et al. |
| 8,856,894 B1 | 10/2014 | Dean et al. |
| 8,856,945 B2 | 10/2014 | Carter et al. |
| 8,860,763 B1 | 10/2014 | Privault et al. |
| 8,868,914 B2 | 10/2014 | Teppler |
| 8,882,509 B1 | 11/2014 | Nunamaker |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,002,753 B2 | 4/2015 | Anschutz et al. |
| 9,058,627 B1 | 6/2015 | Wasser et al. |
| 9,092,616 B2 | 7/2015 | Kumar et al. |
| 9,106,691 B1 | 8/2015 | Burger et al. |
| 9,111,281 B2 | 8/2015 | Stibel et al. |
| 9,118,614 B1 | 8/2015 | Rogers et al. |
| 9,147,042 B1 | 9/2015 | Haller et al. |
| 9,218,481 B2 | 10/2015 | Belisario |
| 9,183,377 B1 | 11/2015 | Sobel et al. |
| 9,202,200 B2 | 12/2015 | Stibel et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,324,080 B2 | 4/2016 | Shafron et al. |
| 9,349,145 B2 | 5/2016 | Rozman et al. |
| 9,400,589 B1 | 7/2016 | Wasser et al. |
| 9,406,085 B1 | 8/2016 | Hunt, III et al. |
| 9,418,213 B1 | 8/2016 | Roth et al. |
| 9,443,268 B1 | 9/2016 | Kapczynski et al. |
| 9,449,346 B1 | 9/2016 | Hockey et al. |
| 9,477,737 B1 | 10/2016 | Charyk et al. |
| 9,479,471 B2 | 10/2016 | Schoenrock |
| 9,483,606 B1 | 11/2016 | Dean et al. |
| 9,501,583 B2 | 11/2016 | Nordstrom et al. |
| 9,536,238 B2 | 1/2017 | Garrett et al. |
| 9,536,263 B1 | 1/2017 | Dean et al. |
| 9,542,553 B1 | 1/2017 | Burger et al. |
| 9,542,682 B1 | 1/2017 | Taylor et al. |
| 9,569,797 B1 | 2/2017 | Rohn et al. |
| 9,589,266 B2 | 3/2017 | Pourgallah et al. |
| 9,595,023 B1 | 3/2017 | Hockey et al. |
| 9,613,382 B1 | 4/2017 | Newstadt et al. |
| 9,619,751 B2 | 4/2017 | Woon et al. |
| 9,652,802 B1 | 5/2017 | Kasower |
| 9,654,541 B1 | 5/2017 | Kapczynski et al. |
| 9,665,854 B1 | 5/2017 | Burger et al. |
| 9,697,568 B1 | 7/2017 | Hunt, III |
| 9,704,107 B1 | 7/2017 | Baker, IV et al. |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,824,199 B2 | 11/2017 | Kshirsagar et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |
| 9,916,621 B1 | 3/2018 | Wasser et al. |
| 9,972,048 B1 | 5/2018 | Dean et al. |
| 9,990,674 B1 | 6/2018 | Taylor et al. |
| 10,002,075 B1 | 6/2018 | O'Leary et al. |
| 10,003,591 B2 | 6/2018 | Hockey et al. |
| 10,025,842 B1 | 7/2018 | Charyk et al. |
| 10,043,214 B1 | 8/2018 | Hunt, III |
| 10,061,936 B1 | 8/2018 | Burger et al. |
| 10,075,446 B2 | 9/2018 | McMillan et al. |
| 10,102,570 B1 | 10/2018 | Kapczynski et al. |
| 10,104,059 B2 | 10/2018 | Hockey et al. |
| 10,176,233 B1 | 1/2019 | Dean et al. |
| 10,187,341 B2 | 1/2019 | Schoenrock |
| 10,255,598 B1 | 4/2019 | Dean et al. |
| 10,262,364 B2 | 4/2019 | Taylor et al. |
| 10,269,065 B1 | 4/2019 | Kapczynski et al. |
| 10,277,659 B1 | 4/2019 | Kapczynski et al. |
| D847,840 S | 5/2019 | Poschel et al. |
| D851,126 S | 6/2019 | Tauban |
| D851,127 S | 6/2019 | Tauban |
| D851,128 S | 6/2019 | Tauban |
| 10,319,029 B1 | 6/2019 | Hockey et al. |
| 10,325,314 B1 | 6/2019 | Kapczynski et al. |
| 10,366,450 B1 | 7/2019 | Mahacek et al. |
| 10,482,532 B1 | 11/2019 | Kapczynski |
| 10,523,653 B2 | 12/2019 | Hockey et al. |
| 10,530,761 B2 | 1/2020 | Hockey et al. |
| 10,614,463 B1 | 4/2020 | Hockey et al. |
| 10,614,519 B2 | 4/2020 | Taylor et al. |
| 10,621,657 B2 | 4/2020 | Kasower |
| 10,628,448 B1 | 4/2020 | Charyk et al. |
| 10,642,999 B2 | 5/2020 | Burger et al. |
| 10,671,749 B2 | 6/2020 | Felice-Steele et al. |
| 10,685,398 B1 | 6/2020 | Olson et al. |
| 10,686,773 B2 | 6/2020 | Britti et al. |
| 10,706,453 B1 | 7/2020 | Morin et al. |
| 10,726,491 B1 | 7/2020 | Hockey et al. |
| 10,798,113 B2 | 10/2020 | Muddu et al. |
| 10,798,197 B2 | 10/2020 | Dean et al. |
| 10,839,446 B1 | 11/2020 | Mupkala et al. |
| 10,878,499 B2 | 12/2020 | Taylor et al. |
| 10,880,313 B2 | 12/2020 | Manna et al. |
| 10,891,691 B2 | 1/2021 | Courbage et al. |
| 10,929,925 B1 | 2/2021 | Hunt, III |
| 10,949,428 B2 | 3/2021 | Poirel et al. |
| 10,963,959 B2 | 3/2021 | Wasser et al. |
| 11,012,491 B1 | 5/2021 | Kapczynski et al. |
| 11,025,629 B2 | 6/2021 | Chasman et al. |
| 11,025,638 B2 | 6/2021 | Ford et al. |
| 11,050,767 B2 | 6/2021 | Black et al. |
| 11,087,022 B2 | 8/2021 | Burger et al. |
| 11,113,759 B1 | 9/2021 | Kapczynski et al. |
| 11,132,742 B1 | 9/2021 | Wasser et al. |
| 11,157,872 B2 | 10/2021 | McMillan et al. |

(56) References Cited

U.S. PATENT DOCUMENTS

| | | |
|---|---|---|
| 11,200,620 B2 | 12/2021 | Dean et al. |
| 11,238,656 B1 | 2/2022 | Lin et al. |
| 11,265,324 B2 | 3/2022 | Felice-Steele et al. |
| 11,308,551 B1 | 4/2022 | Mahacek et al. |
| 11,315,179 B1 | 4/2022 | Rehder et al. |
| 11,356,430 B1 | 6/2022 | Kapczynski et al. |
| 11,373,109 B2 | 6/2022 | Zoldi et al. |
| 11,379,916 B1 | 7/2022 | Taylor et al. |
| 11,399,029 B2 | 7/2022 | Manna et al. |
| 11,425,144 B2 | 8/2022 | Bondugula et al. |
| 11,436,626 B2 | 9/2022 | Lawrence et al. |
| 11,461,364 B1 | 10/2022 | Charyk et al. |
| 11,489,834 B1 | 11/2022 | Carroll et al. |
| 11,514,519 B1 | 11/2022 | Hunt, III |
| 11,580,598 B1 | 2/2023 | Rehder et al. |
| 11,631,130 B1 | 4/2023 | Taylor et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034631 A1 | 10/2001 | Kiselik |
| 2001/0037204 A1 | 11/2001 | Horn et al. |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1 | 11/2001 | Gonen-Friedman et al. |
| 2001/0049274 A1 | 12/2001 | Degraeve |
| 2001/0049620 A1 | 12/2001 | Blasko |
| 2001/0053989 A1 | 12/2001 | Keller et al. |
| 2002/0010616 A1 | 1/2002 | Itzaki |
| 2002/0010635 A1 | 1/2002 | Tokiwa |
| 2002/0013827 A1 | 1/2002 | Edstrom et al. |
| 2002/0013899 A1 | 1/2002 | Faul |
| 2002/0023108 A1 | 2/2002 | Daswani et al. |
| 2002/0026507 A1 | 2/2002 | Sears et al. |
| 2002/0029192 A1 | 3/2002 | Nakagawa et al. |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0035520 A1 | 3/2002 | Weiss |
| 2002/0045154 A1 | 4/2002 | Wood et al. |
| 2002/0049624 A1 | 4/2002 | Raveis, Jr. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0069122 A1 | 6/2002 | Yun et al. |
| 2002/0069182 A1 | 6/2002 | Dwyer |
| 2002/0073017 A1 | 6/2002 | Robertson |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0099635 A1 | 7/2002 | Guiragosian |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0116247 A1 | 8/2002 | Tucker et al. |
| 2002/0116331 A1 | 8/2002 | Cataline et al. |
| 2002/0120537 A1 | 8/2002 | Morea et al. |
| 2002/0120757 A1 | 8/2002 | Sutherland et al. |
| 2002/0120846 A1 | 8/2002 | Stewart et al. |
| 2002/0126449 A1 | 9/2002 | Casebolt |
| 2002/0128917 A1 | 9/2002 | Grounds |
| 2002/0128962 A1 | 9/2002 | Kasower |
| 2002/0130894 A1 | 9/2002 | Young et al. |
| 2002/0133365 A1 | 9/2002 | Grey et al. |
| 2002/0133462 A1 | 9/2002 | Shteyn |
| 2002/0133504 A1* | 9/2002 | Vlahos ............... G06F 16/256 |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0149794 A1 | 10/2002 | Yoshioka et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1* | 11/2002 | Ferguson, III ......... G06Q 20/04 705/4 |
| 2002/0174010 A1 | 11/2002 | Rice |
| 2002/0174016 A1 | 11/2002 | Cuervo |
| 2002/0174048 A1 | 11/2002 | Dheer et al. |
| 2002/0174061 A1 | 11/2002 | Srinivasan et al. |
| 2002/0188511 A1 | 12/2002 | Johnson et al. |
| 2002/0194120 A1 | 12/2002 | Russell et al. |
| 2002/0194140 A1 | 12/2002 | Makuck |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198824 A1 | 12/2002 | Cook |
| 2002/0198830 A1 | 12/2002 | Randell et al. |
| 2003/0002671 A1 | 1/2003 | Inchalik et al. |
| 2003/0004853 A1 | 1/2003 | Ram et al. |
| 2003/0004855 A1 | 1/2003 | Dutta et al. |
| 2003/0004922 A1 | 1/2003 | Schmidt et al. |
| 2003/0007283 A1 | 1/2003 | Ostwald et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0028529 A1* | 2/2003 | Cheung ............... G06Q 30/02 |
| 2003/0036952 A1 | 2/2003 | Panttaja et al. |
| 2003/0036995 A1 | 2/2003 | Lazerson |
| 2003/0041019 A1 | 2/2003 | Vagim, III et al. |
| 2003/0041031 A1 | 2/2003 | Hedy |
| 2003/0046311 A1 | 3/2003 | Baidya et al. |
| 2003/0048294 A1 | 3/2003 | Arnold |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0078897 A1 | 4/2003 | Florance et al. |
| 2003/0078926 A1 | 4/2003 | Uthe et al. |
| 2003/0088472 A1 | 5/2003 | Offutt et al. |
| 2003/0090586 A1 | 5/2003 | Jan et al. |
| 2003/0093289 A1 | 5/2003 | Thornley et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0186200 A1 | 10/2003 | Selix |
| 2003/0187768 A1 | 10/2003 | Ryan et al. |
| 2003/0187837 A1 | 10/2003 | Culliss |
| 2003/0191711 A1 | 10/2003 | Jamison et al. |
| 2003/0191731 A1 | 10/2003 | Stewart et al. |
| 2003/0195805 A1 | 10/2003 | Storey |
| 2003/0195859 A1 | 10/2003 | Lawrence |
| 2003/0200142 A1 | 10/2003 | Hicks et al. |
| 2003/0204429 A1 | 10/2003 | Botscheck et al. |
| 2003/0204752 A1 | 10/2003 | Garrison |

(56) References Cited

U.S. PATENT DOCUMENTS

| | | |
|---|---|---|
| 2003/0208412 A1 | 11/2003 | Hillestad et al. |
| 2003/0212745 A1 | 11/2003 | Caughey |
| 2003/0212909 A1 | 11/2003 | Chandrashekhar |
| 2003/0214775 A1 | 11/2003 | Fukuta et al. |
| 2003/0219709 A1 | 11/2003 | Olenick et al. |
| 2003/0220858 A1 | 11/2003 | Lam et al. |
| 2003/0225742 A1 | 12/2003 | Tenner et al. |
| 2003/0229504 A1 | 12/2003 | Hollister |
| 2003/0229580 A1 | 12/2003 | Gass et al. |
| 2003/0229585 A1* | 12/2003 | Butler .............. G06Q 30/02 705/35 |
| 2003/0236701 A1 | 12/2003 | Rowney et al. |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019549 A1 | 1/2004 | Gulbrandsen |
| 2004/0019799 A1 | 1/2004 | Vering et al. |
| 2004/0023637 A1 | 2/2004 | Johnson et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0045028 A1 | 3/2004 | Harris |
| 2004/0046033 A1 | 3/2004 | Kolodziej et al. |
| 2004/0059786 A1 | 3/2004 | Caughey |
| 2004/0062213 A1 | 4/2004 | Koss |
| 2004/0078323 A1 | 4/2004 | Johnston et al. |
| 2004/0083159 A1 | 4/2004 | Crosby et al. |
| 2004/0083230 A1 | 4/2004 | Caughey |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098418 A1 | 5/2004 | Hein |
| 2004/0098546 A1 | 5/2004 | Bashant et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133493 A1 | 7/2004 | Ford et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0148200 A1 | 7/2004 | Hodges |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0172360 A1 | 9/2004 | Mabrey et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0198386 A1 | 10/2004 | Dupray |
| 2004/0199456 A1 | 10/2004 | Flint et al. |
| 2004/0199789 A1 | 10/2004 | Shaw et al. |
| 2004/0210661 A1 | 10/2004 | Thompson |
| 2004/0215584 A1 | 10/2004 | Yao |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230499 A1 | 11/2004 | Stack |
| 2004/0230527 A1 | 11/2004 | Hansen et al. |
| 2004/0230534 A1 | 11/2004 | McGough |
| 2004/0236688 A1 | 11/2004 | Bozeman |
| 2004/0243450 A1 | 12/2004 | Bernard, Jr. et al. |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0004864 A1 | 1/2005 | Lent et al. |
| 2005/0010494 A1 | 1/2005 | Mourad et al. |
| 2005/0010513 A1 | 1/2005 | Duckworth et al. |
| 2005/0015273 A1 | 1/2005 | Iyer |
| 2005/0021457 A1 | 1/2005 | Johnson et al. |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027817 A1 | 2/2005 | Novik et al. |
| 2005/0027983 A1 | 2/2005 | Klawon |
| 2005/0033660 A1 | 2/2005 | Solomon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060244 A1 | 3/2005 | Goolkasian et al. |
| 2005/0060332 A1 | 3/2005 | Bernstein et al. |
| 2005/0071328 A1 | 3/2005 | Lawrence |
| 2005/0080716 A1 | 4/2005 | Belyi et al. |
| 2005/0080723 A1 | 4/2005 | Burchetta et al. |
| 2005/0080796 A1 | 4/2005 | Midgley |
| 2005/0086126 A1 | 4/2005 | Patterson |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102209 A1 | 5/2005 | Sagrillo et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160051 A1 | 7/2005 | Johnson |
| 2005/0160280 A1 | 7/2005 | Caslin et al. |
| 2005/0171884 A1 | 8/2005 | Arnott |
| 2005/0198377 A1 | 9/2005 | Ferguson et al. |
| 2005/0203768 A1 | 9/2005 | Florance |
| 2005/0203844 A1 | 9/2005 | Ferguson et al. |
| 2005/0203864 A1 | 9/2005 | Schmidt et al. |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216953 A1 | 9/2005 | Ellingson |
| 2005/0216955 A1 | 9/2005 | Wilkins et al. |
| 2005/0226224 A1 | 10/2005 | Lee et al. |

(56) References Cited

U.S. PATENT DOCUMENTS

| | | |
|---|---|---|
| 2005/0240578 A1 | 10/2005 | Biederman et al. |
| 2005/0251474 A1 | 11/2005 | Shinn et al. |
| 2005/0256766 A1 | 11/2005 | Garcia et al. |
| 2005/0267840 A1 | 12/2005 | Holm-Blagg et al. |
| 2005/0273431 A1 | 12/2005 | Abel et al. |
| 2005/0279827 A1 | 12/2005 | Mascavage et al. |
| 2005/0283415 A1 | 12/2005 | Studnitzer et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0026453 A1 | 2/2006 | Frost et al. |
| 2006/0031158 A1 | 2/2006 | Orman |
| 2006/0031177 A1 | 2/2006 | Rule |
| 2006/0032909 A1* | 2/2006 | Seegar ............... G06Q 40/03 235/380 |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0047605 A1 | 3/2006 | Ahmad |
| 2006/0059062 A1 | 3/2006 | Wood et al. |
| 2006/0059083 A1 | 3/2006 | Friesen et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080210 A1 | 4/2006 | Mourad et al. |
| 2006/0080216 A1 | 4/2006 | Hausman et al. |
| 2006/0080230 A1 | 4/2006 | Freiberg |
| 2006/0080235 A1 | 4/2006 | Fukuda et al. |
| 2006/0080251 A1 | 4/2006 | Fried et al. |
| 2006/0080263 A1 | 4/2006 | Willis et al. |
| 2006/0080274 A1 | 4/2006 | Mourad |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0116931 A1 | 6/2006 | Storey |
| 2006/0116932 A1 | 6/2006 | Storey |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136524 A1 | 6/2006 | Wohlers et al. |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161478 A1 | 7/2006 | Turner et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0212407 A1 | 9/2006 | Lyon |
| 2006/0212486 A1 | 9/2006 | Kennis et al. |
| 2006/0213985 A1 | 9/2006 | Walker et al. |
| 2006/0218407 A1 | 9/2006 | Toms |
| 2006/0223043 A1 | 10/2006 | Dancy-Edwards et al. |
| 2006/0224498 A1 | 10/2006 | Chin |
| 2006/0229943 A1 | 10/2006 | Mathias et al. |
| 2006/0229961 A1 | 10/2006 | Lyftogt et al. |
| 2006/0230343 A1 | 10/2006 | Armandpour et al. |
| 2006/0235935 A1 | 10/2006 | Ng |
| 2006/0239512 A1 | 10/2006 | Petrillo |
| 2006/0245731 A1 | 11/2006 | Lai |
| 2006/0248021 A1 | 11/2006 | Jain et al. |
| 2006/0248048 A1 | 11/2006 | Jain et al. |
| 2006/0248525 A1 | 11/2006 | Hopkins |
| 2006/0253358 A1 | 11/2006 | Delgrosso et al. |
| 2006/0253463 A1 | 11/2006 | Wu et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038483 A1 | 2/2007 | Wood |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0061260 A1 | 3/2007 | deGroeve et al. |
| 2007/0067235 A1 | 3/2007 | Nathans et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0078990 A1 | 4/2007 | Hopkins |
| 2007/0080826 A1 | 4/2007 | Chang |
| 2007/0083460 A1 | 4/2007 | Bachenheimer |
| 2007/0083463 A1 | 4/2007 | Kraft |
| 2007/0088821 A1 | 4/2007 | Sankuratripati et al. |
| 2007/0093234 A1 | 4/2007 | Willis et al. |
| 2007/0094137 A1 | 4/2007 | Phillips et al. |
| 2007/0094230 A1 | 4/2007 | Subramaniam et al. |
| 2007/0094241 A1 | 4/2007 | Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0130347 A1 | 6/2007 | Rangan et al. |
| 2007/0131755 A1 | 6/2007 | Chang |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0152068 A1 | 7/2007 | Kurita |
| 2007/0153085 A1 | 7/2007 | Chang |
| 2007/0153710 A1 | 7/2007 | Hopkins |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0157107 A1 | 7/2007 | Bishop |
| 2007/0160458 A1 | 7/2007 | Yen |
| 2007/0162369 A1 | 7/2007 | Hardison |
| 2007/0162458 A1 | 7/2007 | Fasciano |
| 2007/0174166 A1 | 7/2007 | Jones |
| 2007/0174186 A1 | 7/2007 | Hokland |
| 2007/0174448 A1 | 7/2007 | Ahuja et al. |

(56) References Cited

U.S. PATENT DOCUMENTS

| | | |
|---|---|---|
| 2007/0174903 A1 | 7/2007 | Greff |
| 2007/0180380 A1 | 8/2007 | Khavari et al. |
| 2007/0192167 A1 | 8/2007 | Lei et al. |
| 2007/0198432 A1 | 8/2007 | Pitroda et al. |
| 2007/0203954 A1 | 8/2007 | Vargas et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0206917 A1 | 9/2007 | Ono et al. |
| 2007/0208640 A1 | 9/2007 | Banasiak et al. |
| 2007/0219966 A1 | 9/2007 | Baylis et al. |
| 2007/0220003 A1 | 9/2007 | Chern et al. |
| 2007/0220092 A1 | 9/2007 | Heitzeberg et al. |
| 2007/0220275 A1 | 9/2007 | Heitzeberg et al. |
| 2007/0220581 A1 | 9/2007 | Chang |
| 2007/0226047 A1 | 9/2007 | Ward |
| 2007/0226122 A1 | 9/2007 | Burrell et al. |
| 2007/0233591 A1 | 10/2007 | Newton |
| 2007/0236562 A1 | 10/2007 | Chang |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0262140 A1 | 11/2007 | Long |
| 2007/0266439 A1 | 11/2007 | Kraft |
| 2007/0273558 A1 | 11/2007 | Smith |
| 2007/0276780 A1 | 11/2007 | Iriyama et al. |
| 2007/0282743 A1 | 12/2007 | Lovelett |
| 2007/0287415 A1 | 12/2007 | Yamada |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2007/0299772 A1 | 12/2007 | Mastie et al. |
| 2008/0004957 A1 | 1/2008 | Hildreth et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0015919 A1 | 1/2008 | Busse et al. |
| 2008/0015979 A1 | 1/2008 | Bentley |
| 2008/0021802 A1 | 1/2008 | Pendleton |
| 2008/0021816 A1 | 1/2008 | Lent et al. |
| 2008/0027859 A1 | 1/2008 | Nathans et al. |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0047017 A1 | 2/2008 | Renaud |
| 2008/0052170 A1 | 2/2008 | Storey |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0059447 A1 | 3/2008 | Winner et al. |
| 2008/0060054 A1 | 3/2008 | Srivastava |
| 2008/0065774 A1 | 3/2008 | Keeler |
| 2008/0066188 A1 | 3/2008 | Kwak |
| 2008/0072316 A1 | 3/2008 | Chang et al. |
| 2008/0077526 A1 | 3/2008 | Arumugam |
| 2008/0079809 A1 | 4/2008 | Chang |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0097822 A1 | 4/2008 | Schigel et al. |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103959 A1 | 5/2008 | Carroll et al. |
| 2008/0103972 A1 | 5/2008 | Lanc |
| 2008/0109308 A1 | 5/2008 | Storey |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0114855 A1 | 5/2008 | Welingkar et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120416 A1 | 5/2008 | Hopkins et al. |
| 2008/0120569 A1 | 5/2008 | Mann et al. |
| 2008/0120716 A1 | 5/2008 | Hall et al. |
| 2008/0122920 A1 | 5/2008 | Chang |
| 2008/0126233 A1 | 5/2008 | Hogan |
| 2008/0133273 A1 | 6/2008 | Marshall |
| 2008/0133278 A1 | 6/2008 | Stanfield |
| 2008/0133657 A1 | 6/2008 | Pennington |
| 2008/0140476 A1 | 6/2008 | Anand et al. |
| 2008/0140734 A1 | 6/2008 | Wagner |
| 2008/0140780 A1 | 6/2008 | Hopkins et al. |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0162236 A1 | 7/2008 | Sommerer |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0172304 A1 | 7/2008 | Berkowitz |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0184351 A1* | 7/2008 | Gephart ............... H04L 63/08 726/7 |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208726 A1 | 8/2008 | Tsantes et al. |
| 2008/0208735 A1 | 8/2008 | Balet et al. |
| 2008/0212845 A1 | 9/2008 | Lund |
| 2008/0215640 A1 | 9/2008 | Hartz et al. |
| 2008/0216156 A1 | 9/2008 | Kosaka |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0249925 A1 | 10/2008 | Nazari et al. |
| 2008/0255992 A1 | 10/2008 | Lin |
| 2008/0263013 A1 | 10/2008 | Hopkins |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270292 A1 | 10/2008 | Ghosh et al. |
| 2008/0270294 A1 | 10/2008 | Lent et al. |
| 2008/0270295 A1 | 10/2008 | Lent et al. |
| 2008/0275816 A1 | 11/2008 | Hazlehurst |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0284586 A1 | 11/2008 | Chang |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0297602 A1 | 12/2008 | Chang |
| 2008/0301016 A1 | 12/2008 | Durvasula et al. |
| 2008/0306846 A1 | 12/2008 | Ferguson |
| 2008/0307063 A1 | 12/2008 | Caughey |
| 2008/0316010 A1 | 12/2008 | Chang |
| 2008/0319861 A1 | 12/2008 | Hopkins |
| 2008/0319889 A1* | 12/2008 | Hammad ............ G06Q 20/403 705/35 |

(56) References Cited

U.S. PATENT DOCUMENTS

| | | |
|---|---|---|
| 2008/0319896 A1 | 12/2008 | Carlson et al. |
| 2009/0006230 A1 | 1/2009 | Lyda et al. |
| 2009/0006582 A1 | 1/2009 | Daswani et al. |
| 2009/0018986 A1 | 1/2009 | Alcorn et al. |
| 2009/0024462 A1 | 1/2009 | Lin |
| 2009/0024484 A1 | 1/2009 | Walker et al. |
| 2009/0024485 A1 | 1/2009 | Haugen et al. |
| 2009/0030776 A1 | 1/2009 | Walker et al. |
| 2009/0037279 A1 | 2/2009 | Chockalingam et al. |
| 2009/0037323 A1 | 2/2009 | Feinstein et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0060343 A1 | 3/2009 | Rosca |
| 2009/0064297 A1 | 3/2009 | Selgas et al. |
| 2009/0070148 A1 | 3/2009 | Skocic |
| 2009/0076950 A1 | 3/2009 | Chang et al. |
| 2009/0076966 A1 | 3/2009 | Bishop et al. |
| 2009/0089190 A1 | 4/2009 | Girulat |
| 2009/0089193 A1 | 4/2009 | Palantin |
| 2009/0089869 A1 | 4/2009 | Varghese |
| 2009/0094237 A1 | 4/2009 | Churi et al. |
| 2009/0094675 A1 | 4/2009 | Powers |
| 2009/0099941 A1 | 4/2009 | Berkowitz |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119116 A1 | 5/2009 | Steen |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0132347 A1 | 5/2009 | Anderson et al. |
| 2009/0132813 A1 | 5/2009 | Schibuk |
| 2009/0146879 A1 | 6/2009 | Chang |
| 2009/0147774 A1 | 6/2009 | Caughey |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0195377 A1 | 8/2009 | Chang |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222364 A1 | 9/2009 | McGlynn et al. |
| 2009/0222449 A1 | 9/2009 | Hom et al. |
| 2009/0222527 A1 | 9/2009 | Arconati et al. |
| 2009/0228295 A1 | 9/2009 | Lowy |
| 2009/0228392 A1 | 9/2009 | Pinson, III |
| 2009/0228918 A1 | 9/2009 | Rolff et al. |
| 2009/0228990 A1 | 9/2009 | Chen et al. |
| 2009/0233579 A1 | 9/2009 | Castell et al. |
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271248 A1 | 10/2009 | Sherman et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0281941 A1 | 11/2009 | Worth |
| 2009/0281951 A1 | 11/2009 | Shakkarwar |
| 2009/0282479 A1 | 11/2009 | Smith et al. |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2009/0327487 A1 | 12/2009 | Olson et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0010993 A1 | 1/2010 | Hussey, Jr. et al. |
| 2010/0011428 A1* | 1/2010 | Atwood ............... H04L 63/08 709/227 |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1 | 1/2010 | Sahni et al. |
| 2010/0025820 A1 | 2/2010 | Suekawa |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042542 A1 | 2/2010 | Rose et al. |
| 2010/0042732 A1 | 2/2010 | Hopkins |
| 2010/0043055 A1 | 2/2010 | Baumgart |
| 2010/0049803 A1 | 2/2010 | Ogilvie et al. |
| 2010/0063906 A1 | 3/2010 | Nelsen et al. |
| 2010/0063942 A1 | 3/2010 | Arnott et al. |
| 2010/0063993 A1 | 3/2010 | Higgins et al. |
| 2010/0076833 A1 | 3/2010 | Nelsen |
| 2010/0076966 A1 | 3/2010 | Strutton et al. |
| 2010/0077483 A1 | 3/2010 | Stolfo et al. |
| 2010/0082445 A1 | 4/2010 | Hodge et al. |
| 2010/0082476 A1 | 4/2010 | Bowman |
| 2010/0083371 A1 | 4/2010 | Bennetts et al. |
| 2010/0088188 A1 | 4/2010 | Kumar et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114714 A1 | 5/2010 | Ghosh et al. |
| 2010/0114744 A1 | 5/2010 | Gonen |
| 2010/0114747 A1* | 5/2010 | Kasower ............... G06Q 40/03 705/35 |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0145840 A1* | 6/2010 | Kasower ............... G06Q 40/03 705/35 |
| 2010/0153278 A1 | 6/2010 | Farsedakis |

(56) References Cited

U.S. PATENT DOCUMENTS

| | | |
|---|---|---|
| 2010/0153290 A1 | 6/2010 | Duggan |
| 2010/0161486 A1 | 6/2010 | Liu et al. |
| 2010/0161816 A1 | 6/2010 | Kraft et al. |
| 2010/0169159 A1 | 7/2010 | Rose et al. |
| 2010/0174638 A1* | 7/2010 | DeBie ............ G06Q 40/02 709/204 |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0198636 A1 | 8/2010 | Choudhary et al. |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0215270 A1 | 8/2010 | Manohar et al. |
| 2010/0217837 A1 | 8/2010 | Ansari et al. |
| 2010/0223160 A1 | 9/2010 | Brown |
| 2010/0223184 A1 | 9/2010 | Perlman |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250416 A1 | 9/2010 | Hazlehurst |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257234 A1 | 10/2010 | Caughey |
| 2010/0257577 A1 | 10/2010 | Grandison et al. |
| 2010/0258623 A1 | 10/2010 | Beemer et al. |
| 2010/0258625 A1 | 10/2010 | Stanfield et al. |
| 2010/0259373 A1 | 10/2010 | Chang |
| 2010/0262339 A1 | 10/2010 | Chang |
| 2010/0262535 A1 | 10/2010 | Lent et al. |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0268768 A1 | 10/2010 | Kurtenbach et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0306834 A1 | 12/2010 | Grandison et al. |
| 2010/0312691 A1 | 12/2010 | Johnson, Jr. |
| 2010/0323446 A1 | 12/2010 | Barnett et al. |
| 2010/0324999 A1 | 12/2010 | Conway et al. |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0023115 A1 | 1/2011 | Wright |
| 2011/0029388 A1 | 2/2011 | Kendall et al. |
| 2011/0029566 A1 | 2/2011 | Grandison et al. |
| 2011/0029660 A1 | 2/2011 | Hopkins |
| 2011/0035305 A1 | 2/2011 | Imrey et al. |
| 2011/0035315 A1 | 2/2011 | Langley |
| 2011/0035452 A1 | 2/2011 | Gittleman |
| 2011/0040629 A1 | 2/2011 | Chiu et al. |
| 2011/0047086 A1 | 2/2011 | Heisterkamp et al. |
| 2011/0047606 A1 | 2/2011 | Blomquist |
| 2011/0066495 A1 | 3/2011 | Ayloo et al. |
| 2011/0066618 A1 | 3/2011 | Sigurbjornsson et al. |
| 2011/0066695 A1 | 3/2011 | Hopkins |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0107265 A1 | 5/2011 | Buchanan et al. |
| 2011/0107400 A1 | 5/2011 | Shankaranarayanan et al. |
| 2011/0112899 A1 | 5/2011 | Strutton et al. |
| 2011/0113084 A1 | 5/2011 | Ramnani |
| 2011/0113086 A1 | 5/2011 | Long et al. |
| 2011/0119169 A1 | 5/2011 | Passero et al. |
| 2011/0119765 A1 | 5/2011 | Hering et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0143711 A1 | 6/2011 | Hirson et al. |
| 2011/0145064 A1 | 6/2011 | Anderson et al. |
| 2011/0145899 A1 | 6/2011 | Cao et al. |
| 2011/0148625 A1 | 6/2011 | Velusamy |
| 2011/0161155 A1 | 6/2011 | Wilhem et al. |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0193704 A1 | 8/2011 | Harper et al. |
| 2011/0196791 A1 | 8/2011 | Dominguez |
| 2011/0211445 A1 | 9/2011 | Chen |
| 2011/0213670 A1 | 9/2011 | Strutton et al. |
| 2011/0214187 A1 | 9/2011 | Wittenstein et al. |
| 2011/0243406 A1 | 10/2011 | Chandler |
| 2011/0252071 A1 | 10/2011 | Cidon |
| 2011/0264531 A1 | 10/2011 | Bhatia et al. |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0271329 A1 | 11/2011 | Hulten et al. |
| 2011/0276382 A1 | 11/2011 | Ramchandani et al. |
| 2011/0276396 A1 | 11/2011 | Rathod |
| 2011/0276604 A1 | 11/2011 | Hom et al. |
| 2011/0282711 A1 | 11/2011 | Freishtat et al. |
| 2011/0282783 A1 | 11/2011 | Ferguson et al. |
| 2011/0282943 A1 | 11/2011 | Anderson et al. |
| 2011/0289151 A1 | 11/2011 | Hopkins |
| 2011/0289209 A1 | 11/2011 | Hopkins |
| 2011/0296003 A1 | 12/2011 | McCann et al. |
| 2011/0302083 A1 | 12/2011 | Bhinder |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307474 A1 | 12/2011 | Hom et al. |
| 2011/0307494 A1 | 12/2011 | Snow |
| 2011/0307938 A1 | 12/2011 | Reeves, Jr. et al. |
| 2011/0307957 A1 | 12/2011 | Barcelo et al. |
| 2011/0313915 A1 | 12/2011 | Tang |
| 2011/0314100 A1 | 12/2011 | Hopkins |
| 2011/0314383 A1 | 12/2011 | Abdo et al. |
| 2011/0320582 A1 | 12/2011 | Lewis |
| 2011/0321137 A1 | 12/2011 | Lida et al. |
| 2012/0005070 A1 | 1/2012 | McFall et al. |
| 2012/0005221 A1 | 1/2012 | Ickman et al. |
| 2012/0005542 A1 | 1/2012 | Petersen et al. |
| 2012/0010927 A1 | 1/2012 | Attenberg et al. |
| 2012/0011063 A1 | 1/2012 | Killian et al. |
| 2012/0011158 A1 | 1/2012 | Avner et al. |
| 2012/0011432 A1 | 1/2012 | Strutton |
| 2012/0015717 A1 | 1/2012 | Mosites et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036053 A1 | 2/2012 | Miller |
| 2012/0036065 A1 | 2/2012 | Orttung et al. |
| 2012/0036127 A1 | 2/2012 | Work et al. |
| 2012/0036565 A1 | 2/2012 | Gamez et al. |
| 2012/0042237 A1 | 2/2012 | Armandpour et al. |
| 2012/0047174 A1 | 2/2012 | Avner et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066106 A1 | 3/2012 | Papadimitriou |

(56) References Cited

U.S. PATENT DOCUMENTS

| | | |
|---|---|---|
| 2012/0072382 A1 | 3/2012 | Pearson et al. |
| 2012/0078766 A1 | 3/2012 | Rose et al. |
| 2012/0079598 A1 | 3/2012 | Brock et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0109752 A1 | 5/2012 | Strutton et al. |
| 2012/0110467 A1 | 5/2012 | Blake et al. |
| 2012/0110677 A1 | 5/2012 | Abendroth et al. |
| 2012/0116913 A1 | 5/2012 | Goolkasian |
| 2012/0116969 A1 | 5/2012 | Kumar et al. |
| 2012/0124033 A1 | 5/2012 | Gabriel et al. |
| 2012/0124498 A1 | 5/2012 | Santoro et al. |
| 2012/0131009 A1 | 5/2012 | Nath et al. |
| 2012/0131656 A1 | 5/2012 | Slaton et al. |
| 2012/0135705 A1 | 5/2012 | Thaker |
| 2012/0136763 A1 | 5/2012 | Megdal et al. |
| 2012/0136774 A1 | 5/2012 | Imrey et al. |
| 2012/0144461 A1 | 6/2012 | Rathbun |
| 2012/0151045 A1 | 6/2012 | Anakata et al. |
| 2012/0151046 A1 | 6/2012 | Weiss et al. |
| 2012/0158562 A1 | 6/2012 | Kassir |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0191596 A1 | 7/2012 | Kremen et al. |
| 2012/0191693 A1 | 7/2012 | Alexander |
| 2012/0195412 A1 | 8/2012 | Smith |
| 2012/0198556 A1 | 8/2012 | Patel et al. |
| 2012/0203733 A1 | 8/2012 | Zhang |
| 2012/0215682 A1 | 8/2012 | Lent et al. |
| 2012/0215719 A1 | 8/2012 | Verlander |
| 2012/0216125 A1 | 8/2012 | Pierce |
| 2012/0221467 A1 | 8/2012 | Hamzeh |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0239583 A1 | 9/2012 | Dobrowolski |
| 2012/0240223 A1 | 9/2012 | Tu |
| 2012/0242473 A1 | 9/2012 | Choi |
| 2012/0246060 A1 | 9/2012 | Conyack, Jr. et al. |
| 2012/0246092 A1 | 9/2012 | Stibel et al. |
| 2012/0246093 A1 | 9/2012 | Stibel et al. |
| 2012/0253852 A1 | 10/2012 | Pourfallah et al. |
| 2012/0262386 A1 | 10/2012 | Kwon et al. |
| 2012/0262472 A1 | 10/2012 | Garr et al. |
| 2012/0265607 A1 | 10/2012 | Belwadi |
| 2012/0271660 A1 | 10/2012 | Harris et al. |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278249 A1 | 11/2012 | Duggal et al. |
| 2012/0278767 A1 | 11/2012 | Stibel et al. |
| 2012/0284280 A1 | 11/2012 | Kumar |
| 2012/0290486 A1 | 11/2012 | Dobrowolski et al. |
| 2012/0290660 A1 | 11/2012 | Rao et al. |
| 2012/0290740 A1 | 11/2012 | Tewari et al. |
| 2012/0296804 A1 | 11/2012 | Stibel et al. |
| 2012/0297484 A1 | 11/2012 | Srivastava |
| 2012/0317013 A1 | 12/2012 | Luk et al. |
| 2012/0317014 A1 | 12/2012 | Cerise et al. |
| 2012/0317016 A1 | 12/2012 | Hughes |
| 2012/0321202 A1 | 12/2012 | Fertik et al. |
| 2012/0323695 A1 | 12/2012 | Stibel |
| 2012/0324388 A1 | 12/2012 | Rao et al. |
| 2012/0330689 A1 | 12/2012 | McLaughlin et al. |
| 2013/0006843 A1 | 1/2013 | Tralvex |
| 2013/0006844 A1 | 1/2013 | Kremen |
| 2013/0007012 A1 | 1/2013 | Selkowe Fertik et al. |
| 2013/0007014 A1 | 1/2013 | Fertik et al. |
| 2013/0007891 A1 | 1/2013 | Mogaki |
| 2013/0013513 A1 | 1/2013 | Ledbetter et al. |
| 2013/0013553 A1 | 1/2013 | Stibel et al. |
| 2013/0018798 A1 | 1/2013 | Scipioni |
| 2013/0018811 A1 | 1/2013 | Britti et al. |
| 2013/0018838 A1 | 1/2013 | Parnaby et al. |
| 2013/0018877 A1 | 1/2013 | Gabriel et al. |
| 2013/0018892 A1 | 1/2013 | Castellanos et al. |
| 2013/0018957 A1 | 1/2013 | Parnaby et al. |
| 2013/0024367 A1 | 1/2013 | Bellefeuille et al. |
| 2013/0024520 A1 | 1/2013 | Siminoff |
| 2013/0024813 A1 | 1/2013 | Schnorr et al. |
| 2013/0030826 A1 | 1/2013 | Blom |
| 2013/0031105 A1 | 1/2013 | Stibel et al. |
| 2013/0031109 A1 | 1/2013 | Roulson et al. |
| 2013/0031624 A1 | 1/2013 | Britti et al. |
| 2013/0036466 A1 | 2/2013 | Penta et al. |
| 2013/0040619 A1 | 2/2013 | Grube et al. |
| 2013/0041798 A1 | 2/2013 | Unger |
| 2013/0041810 A1 | 2/2013 | Murrell et al. |
| 2013/0041949 A1 | 2/2013 | Biesecker et al. |
| 2013/0054357 A1 | 2/2013 | Mager et al. |
| 2013/0061335 A1 | 3/2013 | Schwabe |
| 2013/0066716 A1 | 3/2013 | Chen et al. |
| 2013/0066775 A1 | 3/2013 | Milam |
| 2013/0066884 A1 | 3/2013 | Kast et al. |
| 2013/0066922 A1 | 3/2013 | Jang et al. |
| 2013/0067582 A1 | 3/2013 | Donovan et al. |
| 2013/0073366 A1 | 3/2013 | Heath |
| 2013/0080322 A1 | 3/2013 | Adolphe |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0085939 A1 | 4/2013 | Colak et al. |
| 2013/0085953 A1 | 4/2013 | Bhola et al. |
| 2013/0086075 A1 | 4/2013 | Scott et al. |
| 2013/0090982 A1 | 4/2013 | Ross |
| 2013/0103464 A1 | 4/2013 | Kuznetsov |
| 2013/0103571 A1 | 4/2013 | Chung et al. |
| 2013/0104216 A1 | 4/2013 | Dennis et al. |
| 2013/0110557 A1 | 5/2013 | Kasower |
| 2013/0110565 A1 | 5/2013 | Means et al. |
| 2013/0110585 A1 | 5/2013 | Nesbitt et al. |
| 2013/0111436 A1 | 5/2013 | Phan et al. |
| 2013/0117072 A1 | 5/2013 | Nish |
| 2013/0117087 A1 | 5/2013 | Coppinger |
| 2013/0124855 A1 | 5/2013 | Varadarajan et al. |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0179338 A1 | 7/2013 | Evans |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0212187 A1 | 8/2013 | Mortazavi et al. |
| 2013/0232018 A1 | 9/2013 | Keithley et al. |
| 2013/0238387 A1 | 9/2013 | Stibel et al. |
| 2013/0262226 A1 | 10/2013 | LaChapelle et al. |
| 2013/0267171 A1 | 10/2013 | Sarkar et al. |
| 2013/0278515 A1 | 10/2013 | Kikuchi |
| 2013/0279676 A1 | 10/2013 | Baniak et al. |
| 2013/0282819 A1 | 10/2013 | Mehta et al. |
| 2013/0290164 A1 | 10/2013 | Salm |
| 2013/0293363 A1 | 11/2013 | Plymouth |
| 2013/0297499 A1 | 11/2013 | Mukherjee |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0332352 A1 | 12/2013 | Imrey et al. |
| 2013/0339141 A1 | 12/2013 | Stibel et al. |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |

(56) References Cited

U.S. PATENT DOCUMENTS

| | | |
|---|---|---|
| 2014/0025562 A1 | 1/2014 | Rothrock et al. |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0052732 A1 | 2/2014 | Softky |
| 2014/0061302 A1 | 3/2014 | Hammad |
| 2014/0074689 A1 | 3/2014 | Lund et al. |
| 2014/0089166 A1 | 3/2014 | Padawer |
| 2014/0089167 A1 | 3/2014 | Kasower |
| 2014/0089191 A1 | 3/2014 | Brown |
| 2014/0095640 A1 | 4/2014 | Stibel et al. |
| 2014/0096249 A1 | 4/2014 | Dupont et al. |
| 2014/0098142 A1 | 4/2014 | Lee et al. |
| 2014/0098229 A1 | 4/2014 | Lu et al. |
| 2014/0110477 A1 | 4/2014 | Hammad |
| 2014/0114735 A1 | 4/2014 | Isaacson et al. |
| 2014/0122354 A1 | 5/2014 | Stibel et al. |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0172681 A1 | 6/2014 | Lamp et al. |
| 2014/0173732 A1 | 6/2014 | Stibel |
| 2014/0180919 A1 | 6/2014 | Brown |
| 2014/0181285 A1 | 6/2014 | Stevens et al. |
| 2014/0237377 A1 | 8/2014 | Meissner |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0282977 A1 | 9/2014 | Madhu et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0372367 A1 | 12/2014 | McLean et al. |
| 2014/0379554 A1 | 12/2014 | Grossman et al. |
| 2015/0026060 A1 | 1/2015 | Krietzman et al. |
| 2015/0127490 A1 | 5/2015 | Puertas |
| 2015/0134506 A1 | 5/2015 | King et al. |
| 2015/0135305 A1 | 5/2015 | Cabrera et al. |
| 2015/0142639 A1 | 5/2015 | Padawer |
| 2015/0161738 A1 | 6/2015 | Stempora |
| 2015/0178829 A1 | 6/2015 | Weiss |
| 2015/0199757 A1 | 7/2015 | Lindholme et al. |
| 2015/0200948 A1 | 7/2015 | Cairns et al. |
| 2015/0262249 A1 | 9/2015 | Wical |
| 2015/0278277 A1 | 10/2015 | Agrawal et al. |
| 2015/0302521 A1 | 10/2015 | Bartmann |
| 2015/0310543 A1 | 10/2015 | DeBie |
| 2015/0324920 A1 | 11/2015 | Wilson et al. |
| 2015/0326580 A1 | 11/2015 | McMillan et al. |
| 2015/0379407 A1 | 12/2015 | Woon et al. |
| 2016/0232546 A1 | 8/2016 | Ranft |
| 2016/0232605 A1 | 8/2016 | Zhang |
| 2017/0132700 A1 | 5/2017 | Kazerani et al. |
| 2017/0161486 A1 | 6/2017 | Jeon et al. |
| 2017/0200223 A1 | 7/2017 | Kasower |
| 2017/0221121 A1 | 8/2017 | Davis et al. |
| 2017/0262821 A1 | 9/2017 | Imrey et al. |
| 2017/0352014 A1 | 12/2017 | Smith et al. |
| 2017/0352186 A1 | 12/2017 | Dauphiny et al. |
| 2018/0040063 A1 | 2/2018 | Buechler et al. |
| 2018/0082372 A1 | 3/2018 | Diana |
| 2018/0164877 A1 | 6/2018 | Miller et al. |
| 2018/0176267 A1 | 6/2018 | Malatesha et al. |
| 2018/0204279 A1 | 7/2018 | Painter et al. |
| 2018/0218448 A1 | 8/2018 | Thomas et al. |
| 2018/0225756 A1 | 8/2018 | Wasser et al. |
| 2018/0285981 A1 | 10/2018 | Andringa et al. |
| 2018/0343265 A1 | 11/2018 | McMillan et al. |
| 2018/0349992 A1 | 12/2018 | Dean et al. |
| 2018/0365445 A1 | 12/2018 | Burger et al. |
| 2019/0019185 A1 | 1/2019 | Chitalia et al. |
| 2019/0034625 A1 | 1/2019 | Ford et al. |
| 2019/0051305 A1 | 2/2019 | Liddell et al. |
| 2019/0066203 A1 | 2/2019 | Smith et al. |
| 2019/0102438 A1 | 4/2019 | Murray et al. |
| 2019/0147366 A1 | 5/2019 | Sankaran et al. |
| 2019/0188717 A1 | 6/2019 | Putnam et al. |
| 2019/0188781 A1 | 6/2019 | O'Brien et al. |
| 2019/0197528 A1 | 6/2019 | Dean et al. |
| 2019/0258818 A1 | 8/2019 | Yu et al. |
| 2019/0260843 A1 | 8/2019 | Dean et al. |
| 2019/0295165 A1 | 9/2019 | Kapczynski et al. |
| 2019/0296804 A1 | 9/2019 | Eitan et al. |
| 2019/0318122 A1 | 10/2019 | Hockey et al. |
| 2019/0332400 A1 | 10/2019 | Spoor et al. |
| 2019/0355362 A1 | 11/2019 | Brown et al. |
| 2020/0034927 A1 | 1/2020 | Smith et al. |
| 2020/0051115 A1 | 2/2020 | Lawrence et al. |
| 2020/0051527 A1 | 2/2020 | Ngo |
| 2020/0074100 A1 | 3/2020 | Raneri et al. |
| 2020/0074541 A1 | 3/2020 | Finneran et al. |
| 2020/0074542 A1 | 3/2020 | Manna et al. |
| 2020/0074745 A1 | 3/2020 | Lyren |
| 2020/0076813 A1 | 3/2020 | Felice-Steele et al. |
| 2020/0090265 A1 | 3/2020 | Quinn et al. |
| 2020/0106764 A1 | 4/2020 | Hockey et al. |
| 2020/0106765 A1 | 4/2020 | Hockey et al. |
| 2020/0126126 A1 | 4/2020 | Briancon et al. |
| 2020/0137110 A1 | 4/2020 | Tyler et al. |
| 2020/0143384 A1 | 5/2020 | Koontz et al. |
| 2020/0160372 A1 | 5/2020 | Andrick |
| 2020/0174010 A1 | 6/2020 | Pfeiffer et al. |
| 2020/0193413 A1 | 6/2020 | Jangama et al. |
| 2020/0193423 A1 | 6/2020 | Jangama et al. |
| 2020/0201878 A1 | 6/2020 | Putnam et al. |
| 2020/0202425 A1 | 6/2020 | Taylor-Shoff et al. |
| 2020/0211099 A1 | 7/2020 | Smith et al. |
| 2020/0213206 A1 | 7/2020 | Bracken et al. |
| 2020/0311168 A1 | 10/2020 | Rokos |
| 2020/0342039 A1 | 10/2020 | Bakir et al. |
| 2020/0342527 A1 | 10/2020 | Kasower |
| 2020/0364785 A1 | 11/2020 | Olson et al. |
| 2020/0372173 A1 | 11/2020 | Burger et al. |
| 2020/0380599 A1 | 12/2020 | Wasser et al. |
| 2020/0389461 A1 | 12/2020 | Felice-Steele et al. |
| 2020/0402159 A1 | 12/2020 | Arnold et al. |
| 2021/0004703 A1 | 1/2021 | Zoldi et al. |
| 2021/0027357 A1 | 1/2021 | Bonfigli et al. |
| 2021/0152567 A1 | 5/2021 | Huston, III et al. |
| 2021/0194885 A1 | 6/2021 | Manna |
| 2021/0234869 A1 | 7/2021 | Bondugula et al. |
| 2022/0027853 A1 | 1/2022 | McMillan et al. |
| 2022/0217146 A1 | 7/2022 | Felice-Steele et al. |
| 2022/0374744 A1 | 11/2022 | Zoldi et al. |
| 2023/0007007 A1 | 1/2023 | Manna |
| 2023/0054085 A1 | 2/2023 | Bondugula et al. |

FOREIGN PATENT DOCUMENTS

| | | |
|---|---|---|
| EP | 0 542 298 | 5/1993 |
| EP | 1 239 378 | 9/2002 |
| EP | 1 301 887 | 4/2003 |
| EP | 1 591 931 | 11/2005 |
| EP | 1 850 278 | 10/2007 |
| EP | 2 088 743 | 8/2009 |
| EP | 2 151 793 | 2/2010 |
| EP | 2 472 423 | 7/2012 |
| GB | 2 102 606 | 2/1983 |
| JP | 2005-208945 | 8/2005 |
| KR | 10-2000-0063313 | 11/2000 |
| KR | 10-2002-0039203 | 5/2002 |
| KR | 10-2004-0078798 | 9/2004 |
| KR | 10-2007-0081504 | 8/2007 |
| TW | I256569 | 6/2006 |
| WO | WO 91/16691 | 10/1991 |
| WO | WO 00/051052 | 8/2000 |
| WO | WO 00/055778 | 9/2000 |
| WO | WO 01/009752 | 2/2001 |

(56) References Cited

FOREIGN PATENT DOCUMENTS

| | | |
|---|---|---|
| WO | WO 01/009792 | 2/2001 |
| WO | WO 01/046889 | 6/2001 |
| WO | WO 01/084281 | 11/2001 |
| WO | WO 02/029636 | 4/2002 |
| WO | WO 2004/031986 | 4/2004 |
| WO | WO 2004/114160 | 12/2004 |
| WO | WO 2005/010683 | 2/2005 |
| WO | WO 2005/033979 | 4/2005 |
| WO | WO 2005/098630 | 10/2005 |
| WO | WO 2006/050278 | 5/2006 |
| WO | WO 2006/069199 | 6/2006 |
| WO | WO 2007/084555 | 7/2007 |
| WO | WO 2007/103203 | 9/2007 |
| WO | WO 2008/021104 | 2/2008 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/109576 | 9/2011 |
| WO | WO 2012/054401 | 4/2012 |
| WO | WO 2012/097171 | 7/2012 |
| WO | WO 2013/009920 | 1/2013 |
| WO | WO 2013/015746 | 1/2013 |
| WO | WO 2019/089439 | 5/2019 |
| WO | WO 2020/051154 | 3/2020 |
| WO | WO 2020/072239 | 4/2020 |

OTHER PUBLICATIONS

U.S. Appl. No. 12/705,511, filed Feb. 12, 2010, Bargoli et al..
European Network and Information Security Agency (enisa): Privacy and Security Risks when Authenticating on the Internet with European eID Cards, Nov. 2009, pp. 1-41.
Federal Bureau of Investigation (FBI): The Cyber Threat to The Financial Sector: Testimony, Sep. 14, 2011, pp. 1-6.
"12 Mag: How Debt Settlement is Helpful in Improving the Credit Score", Weblog post. Newstex Trade & Industry Blogs, Newstex, Oct. 8, 2017, pp. 2.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&SID=1&Fmt=3&clientld=19649&RQT=309&Vname=PQD.
ABC News Now: Money Matters, as broadcasted Nov. 15, 2005 with guest Todd Davis (CEO of Lifelock), pp. 6.
Announcing TrueProfiler, http://web.archive.org/web/20021201123646/http://www.truecredit.com/index.asp, dated Dec. 1, 2002, 1 page.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Awoonor-Williams, Princess Josephine, Ph.D. "Gender and Credit: An Analysis of Women's Experience in the Credit Market", ProQuest Dissertations and Theses, May 2004, pp. 148.

"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57,60.
Bluecava, "What We Do", http://www.bluecava.com/what-we-do/, printed Nov. 5, 2012 in 3 pages.
Buxfer, http://www.buxfer.com/ printed Feb. 5, 2014 in 1 page.
Caldeiira et al., "Characterizing and Preventing Chargebacks in Next Generation Web Payments Services", 2012 Fourth International Conference on Computational Aspects of Social Networks (CASoN), 2012 IEEE, pp. 333-338.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx"http://web.archive.org/web/20101026041841/http://comlounge.net/rpx as captured Oct. 26, 2010 in 9 pages.
Creditkarma, http://www.creditkarma.com printed Feb. 8, 2013 in 2 pages.
Creditsesame, http://www.creditsesame.com/how-it-works/our-technology/ printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
Consumer Financial Protection Bureau (CFPB), "Analysis of Difference between Consumer-and Creditor-Purchased Credit Scores", Sep. 2012, pp. 42.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010,http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning: Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20cons umers%20in%20cross-border%20disputes.pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.

(56) References Cited

OTHER PUBLICATIONS

Equifax, "Business Status Alerts: User Guide", Jul. 2009, pp. 1-21.
Equifax Consumer Credit Report http://www.equifax.com/home/, as retrieved on Sep. 17, 2008.
Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Expensr.com http://www.expensr.com/, as retrieved on Sep. 17, 2008.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
Familysecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W. . . &VR=2.0 as printed Dec. 17, 2009, pp. 5.
Fisher, Greg, "Credit Score Distribution and Practical Range Statistics", Feb. 23, 2010, The Credit Scoring Site, pp. 2.
Fitzpatrick, Alex, "Facebook Monitors Your Chats for Criminal Activity [REPORT]," Mashable, Jul. 12, 2012 printed Sep. 27, 2013 http://mashable.com/2012/07/12/facebook-scanning-chats/.
"Fraud Alert | Learn How". Fight Identity Theft. http://www.fightidentitytheft.com/flag.html, accessed on Nov. 5, 2009.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Gramazio, Connor C., "Colorgorical: Creating Discriminable and Preferable Color Palettes for Information Visualization", IEEE Transactions on Visualization and Computer Graphics, Jan. 2017, vol. 23, No. 1, pp. 521-530.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.

ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&SID=1&Fmt=3&clientld=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html ?= &gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
Judging Credit: Consumers Need Better Finance Tools, News Journal, Daytona Beach, FL, Dec. 28, 2002.
Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Koka et al., "Online Review Analysis by Visual Feature Selection", 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress (DASC/PiCom/DataCom/CyberSciTech), 2017, pp. 1084-1091.
Lan, Joe, "The Top Portfolio Management Software," http://www.aaii.com/computerizedinvesting/article/the-top-portfolio-management-software, Includes Discussion thread, Fourth Quarter 2011, pp. 17.
Lang et al., "A Collaborative Web-Based Help-System", Proceedings of the 2nd international conference on web intelligence, mining and semantics, Jun. 13-15, 2012, pp. 5.
Lang et al., "An Avatar-Based Help System for Web-Portals", International Conference on Human-Computer Interaction, Springer, Berlin, Heidelberg, 2011, pp. 10.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lauwers et al., "Five Hundred Years of Bookkeeping: A Portrait of Luca Pacioli", Tijdschrift voor Economie en Management, 1994, vol. 39. No. 3, pp. 289-304.
Lee, W.A.; "Experian, on Deal Hunt, Nets Identity Theft Insurer", American Banker: The Financial Services Daily, Jun. 4, 2003, New York, NY, 1 page.

(56) References Cited

OTHER PUBLICATIONS

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Letter to Donald A. Robert from Carolyn B. Maloney, dated Oct. 31, 2007, p. 2.
Letter to Donald A. Robert from Senator Charles E. Schumer, dated Oct. 11, 2007, p. 2.
Letter to Harry C. Gambill from Carolyn B. Maloney, dated Oct. 31, 2007, p. 2.
Letter to Harry C. Gambill from Senator Charles E. Schumer, dated Oct. 11, 2007, p. 2.
Letter to Richard F. Smith from Carolyn B. Maloney, dated Oct. 31, 2007, p. 2.
Letter to Richard F. Smith from Senator Charles E. Schumer, dated Oct. 11, 2007, p. 2.
Li et al., "Automatic Verbal Information Verification for User Authentication", IEEE Transactions on Speech and Audio Processing, vol. 8, No. 5, Sep. 2000, pp. 585-596.
Lifelock, http://web.archive.org/web/20110724011010/http://www.lifelock.com/? as archived Jul. 24, 2011 in 1 page.
Lifelock, "How LifeLock Works," http://www.lifelock.com/lifelock-for-people printed Mar. 14, 2008 in 1 page.
Lifelock, "LifeLock Launches First ID Theft Prevention Program for the Protection of Children," Press Release, Oct. 14, 2005, http://www.lifelock.com/about-US/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Lifelock, "Personal Identity Theft Protection & Identity Theft Products," http://www.lifelock.com/lifelock-for-people, accessed Nov. 5, 2007.
Lifelock, Various Pages, www.lifelock.com/, Jan. 9, 2007, pp. 49.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Loshin, Intelligent Enterprise: Better Insight for Business Decisions, "Value-Added Data: Merge Ahead", Feb. 9, 2000, vol. 3, No. 3, 5 pages.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Mannan et al., "Mercury: Recovering Forgotten Passwords Using Personal Devices*", Dec. 17, 2011, Pre-Proceedings of Financial Cryptography and Data Security 2011, pp. 1-16.
Meyers et al., "Using Your Social Networking Accounts To Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008 in 1 page.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
Myrateplan.com, "Cell Phone Buying Guide", http://web.archive.org/web/20061116103256/http://myrateplan.com/cell_phone_buying_guide/family_plans/, as archived Nov. 16, 2006 in 2 pages.
Myreceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory,http://directory.westlaw.com/scope/default.asp?db=NA-ALL&RS=W. . . &VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New for Investors: Asset Allocation, Seasoned Returns and More," Prosper,http://blog.prosper.com/2011/10/27/new-for-investors-asset-allocation-seasoned-returns-and-more/, Oct. 27, 2011, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Oracle: Recommendations for Leveraging the Critical Patch Update and Maintaining a Proper Security Posture, Nov. 2010, An Oracle White Paper, pp. 1-30.
Organizing Maniac's Blog—Online Receipts Provided by MyQuickReceipts.com,http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Paustian, Chuck, "Every Cardholder a King Customers get the Full Treatment at Issuers' Web Sites," Card Marketing, New York, Mar. 2001, vol. 5, No. 3, pp. 4.
Peltier, Jon, "Conditional Formatting of Excel Charts", Peltier Tech Blog, as posted Feb. 13, 2012, http://peltiertech.com/conditional-formatting-of-excel-charts/, pp. 1-5.
Peng et al., "Factors Affecting Online Purchase Behavior: Implications to Improve the Existing CreditRating System", 2009 International Conference on Management and Service Science, 2009 IEEE, pp. 1-4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
Personalcapital.com, http://www.personalcapital.com/how-it-works printed Feb. 5, 2014 in 5 pages.
Phinisee, Tamarind, "Banks, FTC Step Up Efforts to Address Identity Theft", San Antonio Business Journal; San Antonio, Jul. 5, 2002, vol. 16, No. 24, p. 5.

(56) References Cited

OTHER PUBLICATIONS

Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts, pp. 6.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Press Release—"Helping Families Protect Against Identity Theft —Experian AnnouncesFamilySecure.com; Parents and guardians are alerted for signs of potential identity theft for them and their children; product features an industry-leading $2 million guarantee"; PR Newswire; Irvine, CA; Oct. 1, 2007.
Privacyguard, http://web.archive.org/web/20110728114049/http://www.privacyguard.com/ as archived Jul. 28, 2011 in 1 page.
Privacy Rights Clearinghouse, "Identity Theft: What to do if it Happens to You,"http://web.archive.org/web/19990218180542/http://privacyrights.org/fs/fs17a.htm printed Feb. 18, 1999.
"Qualifying For Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
Reppler.com, "Learn More: Basic Information about how TrustedID Reppler Works For You," www.reppler.com/learn/ printed Oct. 24, 2012 in 2 pages.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Schmidt et al., "A Set of Multi-Touch Graph Interaction Techniques", ITS '10, Nov. 7-10, 2010, Saarbrucken, Germany, pp. 1-4.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
|Sealey, Geraldine, "Child ID Theft Can Go Unnoticed for Years", http://abcnews.go.com/US/story?id=90257, Sep. 12, 2003 in 9 pages.
"Settling Your Debts—Part 1 in Our Debt Settlement Series", http://www.creditinfocenter.com/debt/settle_debts.shtml printed Jan. 9, 2013 in 6 pages.

Shibata et al., "3D Retrieval System Based on Cognitive Level—Human Interface for 3D Building Database", Proceedings of the 2004 International Conference on Cyberworlds (CW'04), 2004, pp. 6.
Shin, Laura, "See an Error on your Credit Report? Credit Karma Now Makes it Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
Shoeboxed, https://www.shoeboxed.com/sbx-home/ printed Oct. 16, 2012 in 4 pages.
Simpson, Glyn, "Microsoft (MS) Money, MSMoney FAQ, Help and Information Pages", pp. 2, Copyright @ Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Solapurkar, Prajakta, "Building Secure Healthcare Services Using OAuth 2.0 and JSON Web Tokenin IOT Cloud Scenario", IEEE, 2nd International Conference on Contemporary Computing and Informatics (ic3i), 2016, pp. 99-104.
Srinivasa et al., "Augmented Reality Adaptive Web Content", 2016 13th IEEE Annual w Consumer Communications & Networking Conference (CCNC), pp. 4.
Stauffer et al., "Using HTML 3.2," Second Edition, 1996, Que Publishing, pp. 192-193.
Stein, Benchmarking Default Prediction Models: Pitfalls and Remedies in Model Validation, Moody's KMV, Revised Jun. 13, 2002, Technical Report #020305; New York.
Tajik, S., "Conditional Plotting, Changing Color of Line Based on Value", MathWorks®, MATLAB Answers ™, Question Posted Feb. 10, 2011 to https://www.mathworks.com/matlabcentral/answers/1156-conditional-plotting-changing-color-of-line-based-on-value?requestedDomain=www.mathworks.com, p. 8.
TheMorningCall.Com, "Cheap Ways to Foil Identity Theft," www.mcall.com/business/columnists/all-karp.5920748jul01,0. . ., published Jul. 1, 2007.
Thompson, Herbert H., "How I Stole Someone's Identity", https://www.scientificamerican.com/article/anatomy-of-a-social-hack/#, Aug. 18, 2008, pp. 5.
Todorova, Aleksandra, "Protecting Your Child's Identity", Smart Money, Published Aug. 2, 2007, pp. 1-5.
"TransUnion—Child Identity Theft Inquiry", TransUnion, http://www.transunion.com/corporate/personal/fraudIdentityTheft/fraudPrevention/childIDInquiry. page as printed Nov. 5, 2009 in 4 pages.
TransUnion Consumer Credit Report http://www.transunion.com/, as retrieved on Sep. 17, 2008.
TRUSTON, "Checking if your Child is an ID Theft Victim can be Stressful," as posted by Michelle Pastor On Jan. 22, 2007 at http://www.mytruston.com/blog/credit/checking_if_your_child_is_an_id_theft_vi.html.
US Legal, Description, http://www.uslegalforms.com/US/US-00708-LTR.htm printed Sep. 4, 2007 in 2 pages.
"Use of Alternative Data to Enhance Credit Reporting to Enable Access to Digital Financial Services byIndividuals and SMEs Operating in the Informal Economy", Guidance Note, International Committee on Credit Reporting (ICCR), Jun. 28, 2018, pp. 35.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, p. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee| Money Center, https://yodleemoneycenter.com/ printed Feb. 5, 2014 in 2 pages.
You Need A Budget, http://www.youneedabudget.com/features printed Feb. 5, 2014 in 3 pages.
International Search Report and Written Opinion for Application No. PCT/US2012/046316, dated Sep. 28, 2012.

(56) References Cited

OTHER PUBLICATIONS

International Preliminary Report on Patentability and Written Opinion for Application No. PCT/US2012/046316, dated Jan. 14, 2014.
International Search Report and Written Opinion for Application No. PCT/US2013/072102, dated Apr. 18, 2014.
International Search Report and Written Opinion for Application No. PCT/US2014/019142, dated Jun. 20, 2014.
International Search Report and Written Opinion for Application No. PCT/US2019/049377, dated Dec. 20, 2019.
Application as filed in U.S. Appl. No. 09/411,683, dated Oct. 4, 1999.

* cited by examiner

Please Wait...

Locating Credit Card Accounts from your Credit History

FIG. 5

CARD REGISTRY SYSTEMS AND METHODS

CROSS-REFERENCE TO RELATED APPLICATIONS

This application is a continuation of U.S. Application No. 17/830,980, filed Jun. 2, 2022, which is a continuation of U.S. application Ser. No. 17/102,070, filed Nov. 23, 2020, which is a continuation of U.S. application Ser. No. 16/839,457, filed Apr. 3, 2020, which is a continuation of U.S. application Ser. No. 16/292,678, filed Mar. 5, 2019, which is a continuation of U.S. application Ser. No. 15/993,404, filed May 30, 2018, which is a continuation of U.S. application Ser. No. 15/654,639, filed Jul. 19, 2017, which is a continuation of U.S. application Ser. No. 15/393,110, filed Dec. 28, 2016, which is a continuation of U.S. application Ser. No. 14/987,463, filed Jan. 4, 2016, which is a continuation of U.S. application Ser. No. 13/919,898, filed Jun. 17, 2013, which is a continuation of U.S. application Ser. No. 13/411,914, filed Mar. 5, 2012, which is a continuation of U.S. application Ser. No. 12/334,278, filed Dec. 12, 2008, which claims priority from U.S. Provisional Application No. 61/013,877, filed Dec. 14, 2007. The entire contents of each of the above referenced applications are hereby expressly incorporated herein by reference in their entireties.

BACKGROUND OF THE INVENTION

Field of the Invention

This invention relates to systems and methods for automating registry of consumer credit cards (and other financial cards) in a card registry service.

Description of the Related Art

Card registry services provide consumers with a repository for information associated with each of a plurality of credit cards that may be accessed when one or more of the credit cards are lost, stolen, or otherwise unavailable, and the consumer wishes to cancel the credit card(s). For example, a consumer may provide information regarding each of their credit cards, including, for example, a card issuer, card number, full name on card, security code on card, and contact information for the card issuer to a card registry service. When the consumer wants to cancel one or more of the registered credit cards, the consumer retrieves the card information from the card registry services and cancels the cards using that information or a customer service representative of the card registry service may help consumer review the registered cards and initiate cancellation of the cards.

SUMMARY OF THE INVENTION

In one embodiment, a card registry service provides a card registry computing system (also referred to herein as a "card registry system") for storing information regarding one or more credit cards for each of a plurality of consumers and, when a consumer contacts the credit card registry service, either by phone, fax, or via an Internet-accessible user interface, for example, the credit cards associated with the particular consumer are determined and the credit card accounts are cancelled electronically by the card registry system or by a fraud prevention representative. In one embodiment, the card registry system is configured to automatically populate a consumer's card registry account with credit card account information retrieved from the consumer's credit file.

In general, a card registry system receives information regarding one or more financial cards, which may include credit, debit, retail store loyalty, ATM, and any other available financial cards, of the consumer so that the card information is available when one or more of the registered cards becomes unavailable (e.g., one or more cards may be lost, stolen, or otherwise compromised). In one embodiment, the consumer provides relevant information regarding the financial cards to be registered with the credit registry service into one or more web interfaces or forms, such as via a keyboard, mouse, and/or microphone, for example. This process can be quite tedious and prone to typographical errors or errors in communication card information, however, especially as the number of cards associated with the consumer increases. Additionally, if a consumer has lost a purse or wallet, the time required to compile and enter the information necessary to register each of the consumer's financial cards may increase the risk of fraudulent use of the financial cards. Accordingly, in an advantageous embodiment, a card registry system is configured to automatically identify financial card information in one or more credit files associated with the consumer and populate the consumer's card registry account with the identified financial card information. For example, if the consumer is enrolled in a credit monitoring service that periodically accesses the consumer's credit file from one or more credit bureaus, information regarding open credit card accounts of the consumer may be extracted from a credit file of the consumer.

In one embodiment, a credit file of the consumer is accessed when the consumer initially enrolls in the card registry service, which may be well before cancellation of any of the registered cards is necessary. In another embodiment, the consumer's enrollment in the card registry service does not immediately initiate retrieval of credit card information from the consumer's credit file. Rather, the card registry service accesses the consumer's credit file when cancellation of cards is initiated by the consumer, such as in response to the consumer losing one or more financial cards. Because the financial card information is electronically accessed from the member's credit file(s), the integrity of the accessed data is increased when compared to manual entry methods that commonly result in typographical and/or communication errors, especially when entering lengthy numeric strings.

In one embodiment, information regarding financial cards that are not listed on a credit file, e.g., debit and/or ATM card, is provided by the consumer via a web interface of the card registry system, for example. In other embodiments, however, information regarding debit and/or ATM cards may be automatically retrieved from services provided by the card registry service and/or affiliates of the card registry service, such as a debit account monitoring service, for example. In one embodiment, debit and/or ATM card information identified in one or more debit reports associated with the consumer is stored in the consumer's card registry account. In other embodiments, other data sources may be accesses in order to automate registration of financial cards with a consumer's card registry account.

In one embodiment, consumers that subscribe to other credit-related services offered by the card registry service provider and/or affiliates of the provider, such as credit monitoring services or other credit or non-credit related services, may easily register with the card registry system with a single click on a webpage of the related service provider. For example, a member of a single or multi-bureau credit monitoring service may easily enroll in the card registry system with a single click on an enrollment button, for example, on the member's account information (or other) page. In another example, a member of a non-credit related product, such as a warranty product, may likewise easily enroll in the card registry system. Thus, in this embodiment, the process of enrolling a consumer in a credit registry service is simplified by using the consumer's member information that has previously been supplied by the consumer in opening the related credit monitoring account.

BRIEF DESCRIPTION OF THE DRAWINGS

FIG. 5 illustrates an exemplary user interface that may be displayed to the consumer in response to the consumer indicating a desire to view and/or cancel one or more financial cards.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
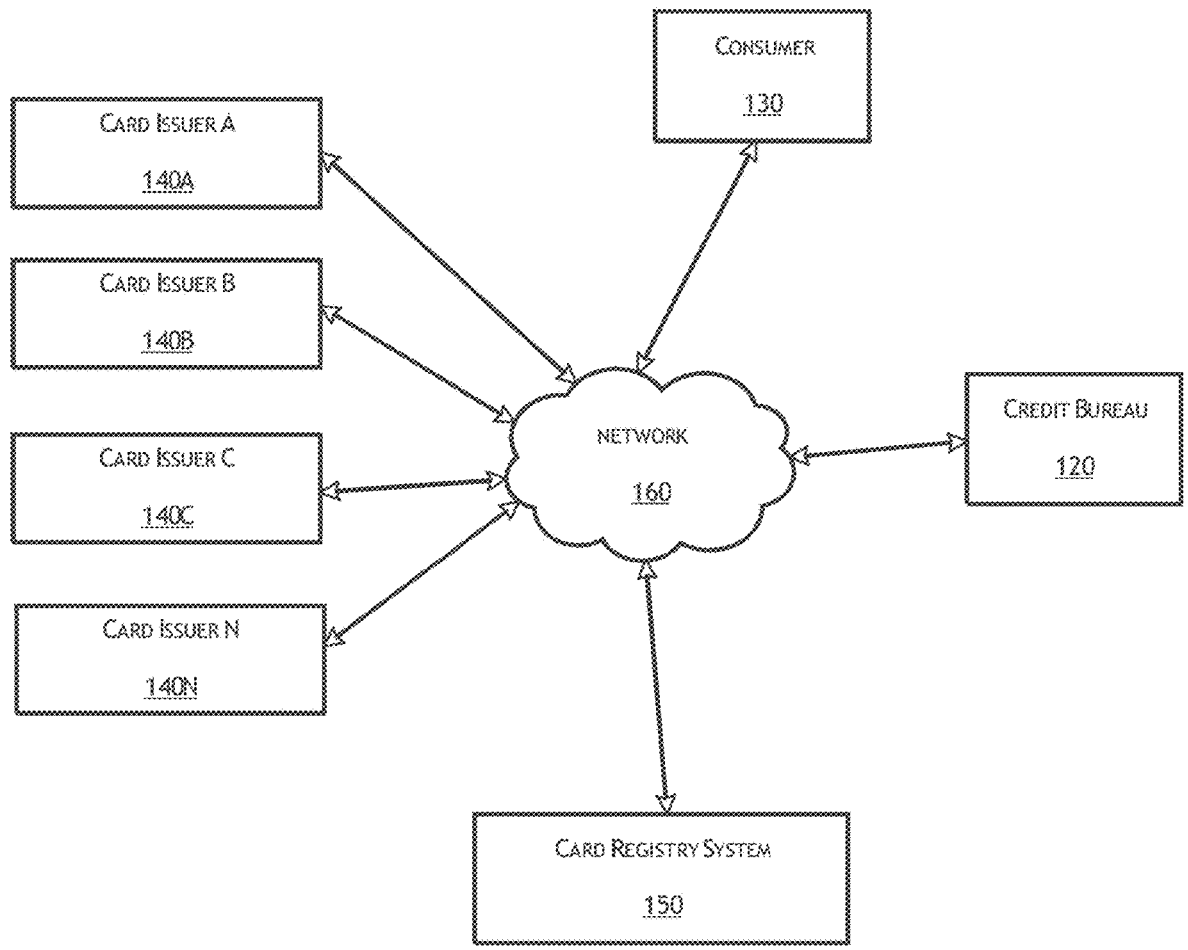
FIG. 1A is a block diagram illustrating one embodiment of a card registry system in communication with a credit bureau, a consumer, and one or more financial card issuers.

FIG. 1A is a block diagram illustrating one embodiment of a card registry system 150 in communication with a credit bureau 120, a consumer 130, and one or more financial card issuers 140 (including card issuer 140A, card issuer 140B, card issuer 140C, and card issuer 140N). In one embodiment, the system outlined in FIG. 1A is computerized, wherein each of the illustrated components comprises a computing device that is configured to communicate with other computer devices via a network 160. For example, the consumer 130 may comprise a computing device, such as a desktop, notebook, or handheld computing device that is configured to transmit and receive data to/from other computing devices via the network 160. Similarly, each of the card issuers 140, the credit bureau 120, and the card registry system 150, may include one or more computing devices that are configured to communicate data with other computing devices via the network 160. Depending on embodiment, the network 160 may comprise one or more of any type of network, such as one or more local area networks, wide area networks, personal area networks, telephone network, and/or the Internet, which may be accessed via any available wired and/or wireless communication protocols. Thus, the network 160 of FIG. 1A may comprise a secure LAN through which the card registry system 150 and the credit bureau 120 communicate, and the network 160 may further comprise an Internet connection through which the card registry system 150 and the consumer 130 communicate. In another embodiment the network 160 comprises one or more telephone networks, whether wireless or wired, that carries voice communications between the consumer 130 and a representative of the card registry system 150, for example. Any other combination of networks, including secured and unsecured network communication links, are contemplated for use in the systems described herein.

Figure 1B:
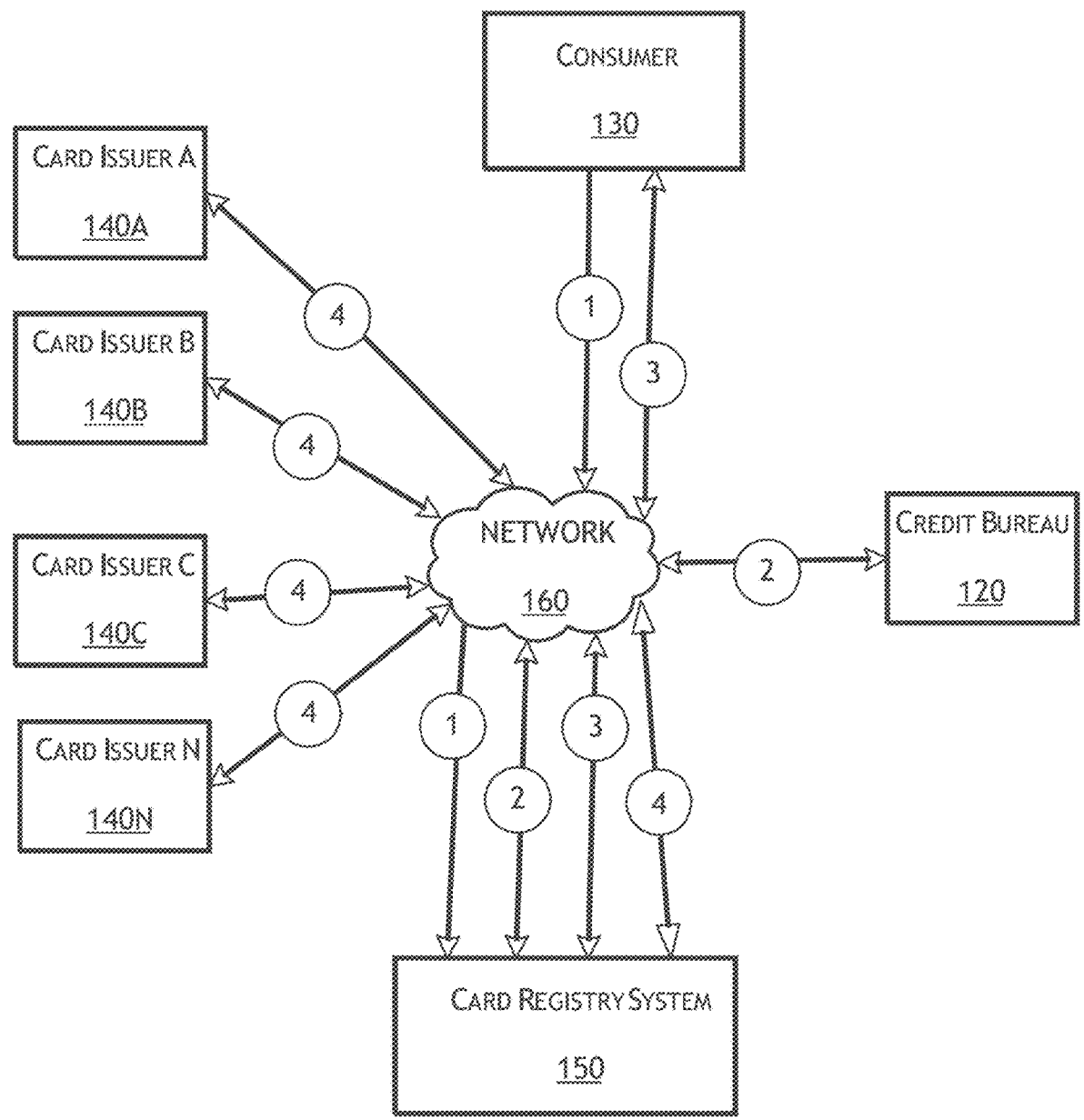
FIG. 1B is a block diagram illustrating another embodiment of a card registry system in communication with a credit bureau, a consumer, and one or more financial card issuers, where an exemplary temporal flow of data is outlined.

FIG. 1B is a block diagram illustrating another embodiment of the card registry system 150, the credit bureau 120, the consumer 130, and the financial card issuers 140 of FIG. 1A, where an exemplary temporal flow of data is outlined. In particular, the circled numerals of FIG. 1B illustrate the order in which data flows between the various components of FIG. 1B according to one embodiment. In other embodiments, the steps outlined by the circled numerals may be performed in a different order, and the method may include fewer or additional steps.

In step one of FIG. 1B, the card registry system 150 receives information from the consumer 130 that allows the card registry system 150 to access a credit file of the consumer 130. For example, the card registry system 150 may receive information from the consumer 130 that is provided to the card registry system 150 as part of an enrollment process in a credit monitoring service. In this embodiment, the card registry system 150 may be controlled by a credit monitoring service and the card registry account may be linked to a credit monitoring account of the consumer 130. Alternatively, in another embodiment in the consumer 130 may establish a card registry account with the card registry system 150 without previously having established a credit monitoring account with the card registry system 150. For example, the consumer 130 may establish a card registry account with the card registry system 150 in response to the consumer 130 needing to urgently cancel one or more financial cards, such as may be desired if the consumer 130 loses a purse or wallet that holds the financial cards. In other embodiments, the card registry system 150 may be controlled and/or incorporated into other services provided by a credit bureau or any other entity. Depending on the embodiment, the consumer may pay either a monthly or annual membership fee for their enrollment in the credit registry service and the membership fee may be billed immediately upon the enrollment, or may be billed periodically. In one embodiment, the card registry service provides a reimbursement guarantee indicating that a registered member will be reimbursed certain or all unauthorized charges that are not covered by the respective card issuers. Such a guarantee may only apply to members that enrolled in the card registry service some predetermined time period (e.g., a day, a month, or six months) prior to needing to use the cancellation/reissuance service. Thus, such a guarantee may motivate consumers to enroll in the card registry service well before they need the cancellation/reissuance service, if ever.

Moving to step two of FIG. 1B, in response to the consumer 130 indicating that one or more financial cards of the consumer 130 should be canceled, the card registry system 150 accesses a credit file of the consumer 130 from any one or all of the credit bureaus 120. The credit file may comprise a credit file from a single credit bureau or a credit file comprising credit data from more than one credit bureau, such as a tri-bureau report. The card registry system 150 may then analyze the credit file and extract credit card account information from the retrieve credit file. In an embodiment where the consumer 130 is already enrolled in a credit monitoring service prior to requesting cancellation of one or more financial cards, the card registry system 150 may access a pre-retrieved copy of the consumer credit file, rather than requesting a current copy of the credit file from the credit bureau 120. Furthermore, if the consumer is enrolled in a credit monitoring service, the card registry system 150 may analyze previous credit files of the consumer, in addition to a current credit file, in an attempt to identify as many of the consumer's credit cards as possible. After extracting the credit card information from the credit file, the card registry system 150 may initiate cancellation of one or more of the identified credit cards. A "credit file," as used herein, includes any data that is stored by a credit bureau, including any information that is included in a consumer credit report, any subset of that information, and/or any other credit data.

Next, in step three the consumer 130 is given the opportunity to add financial cards to the consumer's card registry account that may not have been identified in the consumer's credit file. For example, the consumer may have debit cards, ATM cards, retail store loyalty cards, and/or other financial cards that are not included in a credit file. Thus, the consumer 130 may desire to include these other financial cards in their card registry account so that the financial cards may also be canceled and reissued by the card registry system 150. In one embodiment, the card registry system 150 communicates with devices other than the credit bureau 120 in order to identify financial cards associated with the consumer 130. For example, the card registry system 150 may communicate with a debit reporting service in order to receive information regarding debit accounts associated with the consumer 130. In step three, the consumer 130 is also given the opportunity to select one or more of the identified financial cards for cancellation and possibly reissuance. In another embodiment, all of the financial cards are selected for cancellation as a default and the consumer 130 is given the opportunity to unselect any of the financial cards (maybe not all of the financial cards were in a lost purse that is the catalyst for initiating cancellation of cards). In another embodiment, the consumer may establish groups of financial cards, such as cards that are used by the consumer, those that are only used by a spouse of the consumer, etc., so that one or more groups of financial cards may be selected or unselected for cancellation or reissuance.

In step four of FIG. 1B, the card registry system initiates cancellation of the selected financial cards of the consumer 130. If the consumer has requested cancellation of financial cards from multiple issuers, the card registry system 150 initiates communications with each of those card issuers 140 in order to expedite cancellation of the indicated financial cards. In one embodiment, the cancellation process is automated by the card registry system 150. For example, the card registry system 150 may have established relationships with each of the card issuers 140 such that an electronic cancellation request may be transmitted from the card registry system 150 to a particular card issuer 140 in order to initiate cancellation of one or more of financial cards of the consumer 130 that are held by that card issuer 140. In another embodiment, a fraud resolution or customer service representative with access to the card registry system 150 manually contacts each of the card issuers 140 associated with the financial cards selected for cancellation by the consumer 130. For example, the customer service representative may contact a card issuer 140 via telephone, fax, e-mail, or other means, in order to communicate a cancellation requests on behalf of the consumer 130 to the relevant card issuer 140. In one embodiment, cancellation of certain financial cards may be initiated electronically via direct communication between the card registry system 150 and the associated card issuer 140, while other financial cards of the consumer 130 may be canceled by phone, fax, email, or other communication between the customer service representative and a representative at the associated card issuer 140.

Figure 2:
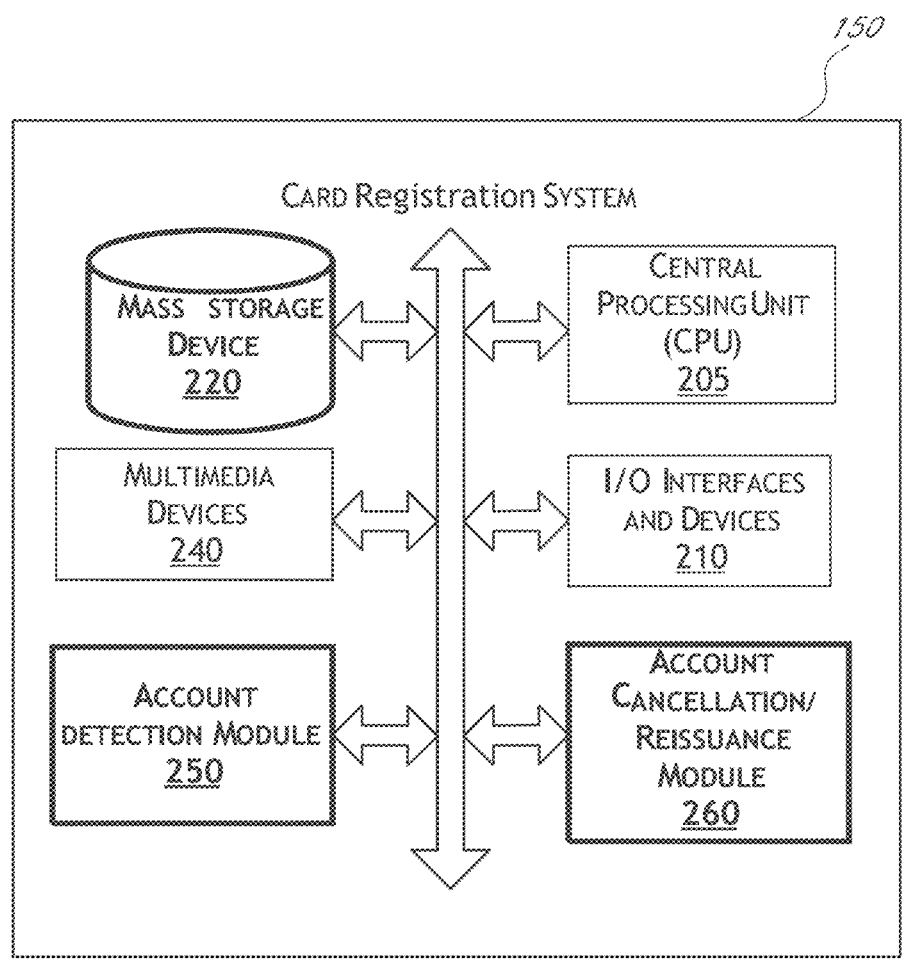
FIG. 2 is a block diagram illustrating one embodiment of a card registry system.

FIG. 2 is a block diagram illustrating one embodiment of the card registry system 150. In one embodiment, the card registry system 150 is configured to interface with multiple devices and/or data sources, such as in the exemplary network configurations of FIGS. 1A and 1B. The card registry system 150 may be used to implement certain systems and methods described herein. For example, in one embodiment the card registry system 150 may be configured to access credit files of consumers, identify credit card accounts (and/or other financial cards) included in the credit files, and initiate cancellation and reissuance of the identified credit card accounts based on the information regarding the credit card accounts that is located in the credit file. The functionality provided for in the components and modules of the card registry system 150 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, C++, JavaScript, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

In one embodiment, the card registry system 150 includes, for example, a server or a personal computer that is IBM, Macintosh, or Linux/Unix compatible. In another embodiment, the card registry system 150 comprises a laptop computer, smart phone, personal digital assistant, or other computing device, for example. In one embodiment, the exemplary card registry system 150 includes a central processing unit ("CPU") 205, which may include one or more conventional or proprietary microprocessors. The card registry system 150 further includes a memory, such as random access memory ("RAM") for temporary storage of information and a read only memory ("ROM") for permanent storage of information, and a mass storage device 220, such as a hard drive, diskette, or optical media storage device. In certain embodiments, the mass storage device 220 stores card registry account information, such as financials card information associated with financial cards of respective consumers. In one embodiment, the financial card information includes information regarding a card issuer that may be used to initiate cancellation of the respective financial card, among other information that uniquely identifies a particular financial card. In one embodiment, the card issuer information is retrieved from a credit file of the consumer so that the consumer is not required to manually provide the card issuer information. Typically, the modules of the card registry system 150 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example.

The card registry system 150 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the card registry system 150 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary card registry system 150 may include one or more commonly available input/output (I/O) interfaces and devices 210, such as a keyboard, mouse, touchpad, and printer. In one embodiment, the I/O devices and interfaces 210 include one or more display device, such as a monitor, that allows the visual presentation of data to a user. More particularly, a display device provides for the presentation of GUIs, application software data, and multimedia presentations, for example. The card registry system 150 may also include one or more multimedia devices 240, such as speakers, video cards, graphics accelerators, and microphones, for example. In one embodiment, the I/O interfaces and devices 210 comprise devices that are in communication with modules of the card registry system 150 via a network, such as the network 160 and/or any secured local area network, for example.

In the embodiment of FIG. 2, the I/O devices and interfaces 210 provide a communication interface to various external devices. For example, in this embodiment the card registry system 150 is in communication with a network 160, such as any combination of one or more LANs, WANs, or the Internet, for example, via a wired, wireless, or combination of wired and wireless, connections via a network interface of the I/O devices and interfaces 210.

In the embodiment of FIG. 2, the card registry system 150 also includes two application modules that may be executed by the CPU 105. More particularly, the application modules include an account detection module 250 and an account cancellation/reissuance module 260. In one embodiment, the account detection module 250 is configured to access a credit file of the consumer 130 and to identify credit card account information within the credit file. For example, the consumer may have several different credit cards from different issuers. A credit file of the consumer 130 should include information on each of these issued credit cards. Thus, the account detection module, using document parsing technology, may scan the credit files (or only the relevant portions of the credit file or other credit information) for information associated with open credit card accounts. In one embodiment, the account detection module 250 identifies only the open credit card accounts, as a credit file may indicate credit card accounts that are closed and would not require cancellation. In a similar way, the account detection module may access other records associated with the consumer 130 in order to identify debit, retail loyalty, or other financial cards associated with the consumer 130. In one embodiment, the account detection module 250 also communicates with a card issuer information source that contains information necessary for cancellation of financial cards that may not be included on a credit file. For example, a card issuer information source may comprise a database that provides detailed information regarding contacts and/or requirements for canceling respective credit cards. In one embodiment, the contact information in the card issuer information source may comprise a secure FTP address, IP address, email address, or any other electronic communication address that may be used by the card registry system 150 in requesting cancellation of a credit card. Thus, the account detection module 250 may be configured to identify credit cards associate with the consumer 130, and the information necessary to initiate cancellation of the credit cards, with little or minimal input from the consumer 130.

The account cancellation/reissuance module 260 is configured to communicate with one or more card issuers 140 in order to initiate cancellation of financial cards that are issued by respective card issuers 140. As noted above, the account cancellation/reissuance module 260 may communicate electronically with some or all of the card issuers 140 in order to communicate a cancellation request to the respective card issuers 140. In another embodiment, the account cancellation/reissuance module 260 may provide information that is usable by a customer service representative in order to initiate cancellation of financial cards, such as by telephone or fax. In one embodiment, the account cancellation/reissuance module 260 also initiates reissuance of financial cards from card issuers 140. If the consumer 130 loses a purse or wallet, for example, that contains multiple financial cards the consumer may not only wish to cancel all of the lost financial cards, but may also be interested in immediately reissuing each (or some) of the financial cards, such as with new account numbers. Thus, the account cancellation/reissuance module 260 may be configured to request both cancellation and reissuance of financial cards from the card issuers 140.

Figure 3:
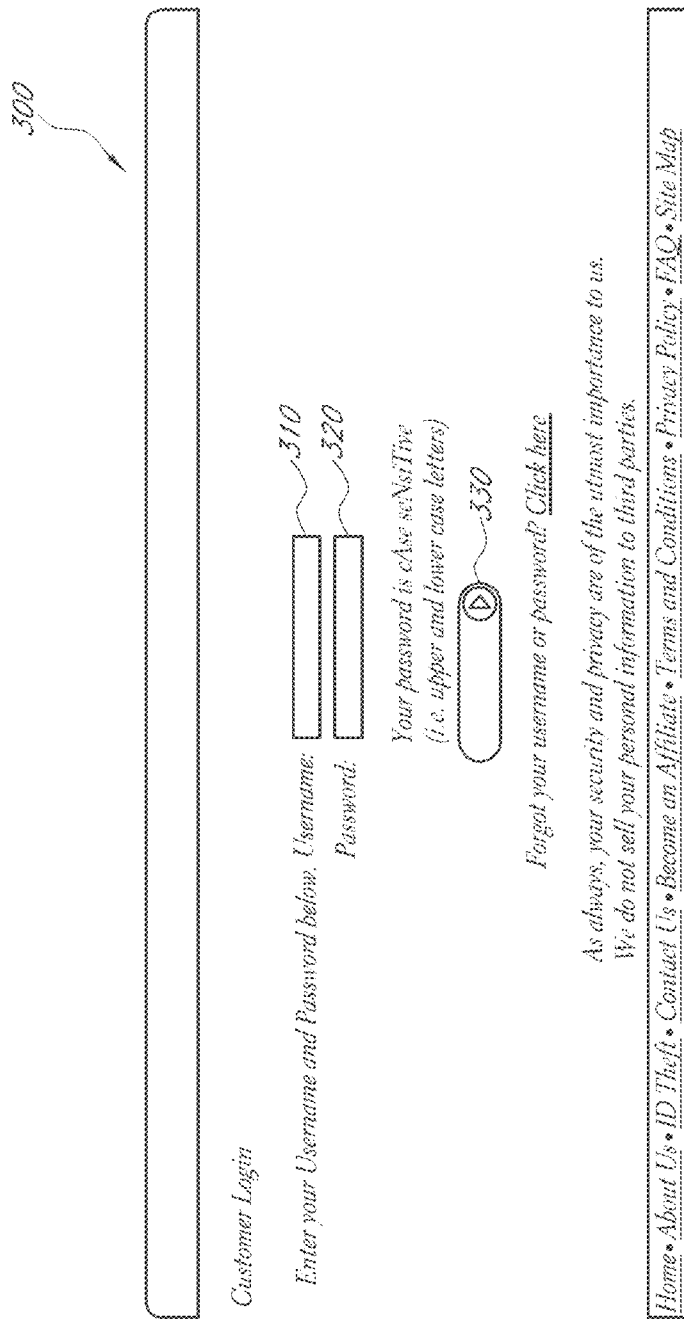
FIG. 3 illustrates an exemplary user interface that may be used by a consumer to log in to the consumer's card registry account, and/or other financial service account offered by the card registry provider.

FIG. 3 illustrates an exemplary user interface 300 that may be used by a consumer to log into the consumer's card registry account, and/or other financial service account offered by the card registry provider. In embodiment of FIG. 3, the user interface 300 comprises a username entry field 310 and a password entry field 320, as well as a login button 330. In this embodiment, the consumer enters their chosen (or assigned) username in the text entry field 310 and the associated password in the password entry field 320, followed by selecting the login button 330, in order to initiate access to the consumer's account. In one embodiment, the user interface 300 allows the consumer access to a credit monitoring service, which may include a card registry service such as that described above with reference to FIGS. 1-2. In other embodiments, a user interface similar to that of FIG. 3 may be used to provide the consumer direct access to a card registry service, without the consumer having previously enrolled in a credit monitoring service. In other embodiments, the consumer may access the card registry service using any other suitable user interface, or by other means such as via telephone, fax, or mail.

Figure 4:
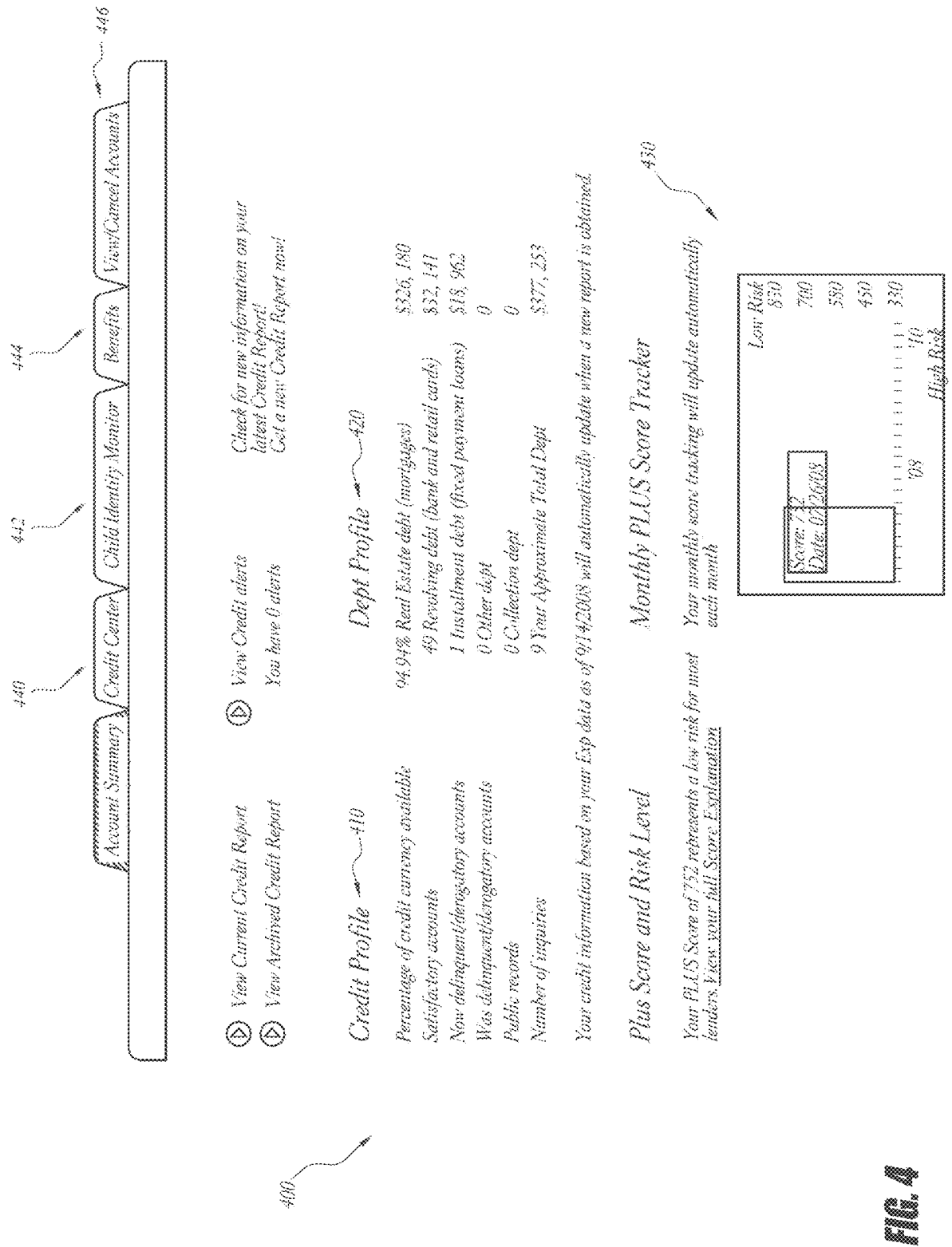
FIG. 4 illustrates an exemplary user interface for a credit monitoring service in which a consumer may enroll.

FIG. 4 illustrates an exemplary user interface for a credit monitoring service in which a consumer may enroll. For example, the user interface 400 may be part of an account summary page that is displayed to the consumer 130 after logging into their credit monitoring account. In other embodiments, the account summary page of a consumer's credit monitoring account may include additional or less information than the user interface of FIG. 4.

The exemplary user interface 400 includes a section summarizing the consumer's credit profile 410, a section summarizing the consumer's debt profile 420, and a section providing a credit score and credit score tracking for the consumer 430. Additionally, the user interface 400 includes links to other portions of the credit monitoring service, including a credit center tab 440, a child identity monitor tab 442, a benefits tab 444, and a view/cancel accounts tab 446. In other embodiments, a credit monitoring service may provide additional or fewer options to a consumer. In the particular embodiment of FIG. 4, the consumer may initiate the process of viewing and/or canceling financial cards by selecting the tab 446. In one embodiment, after selecting the tab 446, the card registry system 150 identifies financial cards associated with the consumer, allows the consumer to edit the identified cards and/or enter information regarding additional financial cards, and initiates cancellation and possibly reissuance of one or more of the financial cards.

FIG. 5 illustrates an exemplary user interface that may be displayed to the consumer in response to the consumer indicating a desire to view and/or cancel one or more financial cards. For example, if the consumer viewing the user interface 400 of FIG. 4 selects the view/cancel accounts tab 446, a user interface such as that illustrated in FIG. 5 may be displayed to the consumer indicating that the card registry system 150, and more particularly, the account detection module 250 (FIG. 2), is analyzing the consumers credit file in order to identify credit card accounts that are listed there on. In one embodiment, the identification of credit card accounts in the consumer's credit file is performed in response to the consumer indicating a desire to view and/or cancel financial cards, such as by selecting the tab 446 of FIG. 4. In other embodiments, the card registry system 150 may identify credit card accounts in the credit file, or credit files, of the consumer on an ongoing basis, such as in response to receiving a periodic credit file from the credit bureau 120 as part of a credit monitoring service in which the consumer has enrolled.

Figure 6:
FIG. 6 illustrates an exemplary user interface that lists the financial cards associated with a particular consumer's card registry account.

FIG. 6 illustrates an exemplary user interface 600 that lists the financial cards associated with an exemplary consumer card registry account. The user interface 600 indicates credit card accounts 610 that have been identified in the consumer's credit file, as well as a store loyalty card 620 that may have been added to the consumers card registry account by the consumer. In addition to the information illustrated in FIG. 6 regarding each of the identified credit card accounts 610, the card registry system may also store information regarding details of communicating with respective card issuers in order to cancel and reissue the indicated credit cards. In the embodiment of FIG. 6, the user interface 600 includes an add account row 630 comprising text entry fields that allow the consumer to add additional financial cards to their card registry account. In this embodiment, the consumer simply clicks on one of the fields in the add account row 630 and then provides the requested information regarding the financial card. After the user has entered information regarding a new card in add account row 630, the consumer initiates storage of the new account information in the consumer's card registry account by selecting the submit update button 640. In other embodiments, other user interfaces may be used to receive information regarding financial cards that a consumer wishes to add to a card registry account.

The user-interface 600 also includes a cancel card(s) button 650 that may be selected to initiate cancellation and possibly reissuance (if the consumer desires reissuance) of one or more of the listed financial cards. In one embodiment, the cancel cards button 650, when selected, may initiate cancellation of all of the cards in the consumers card registry account. In another embodiment, selection of the cancel cards button 650 provides the consumer with another user interface (e.g., FIG. 7) that allows the consumer to select specific financial cards for cancellation and reissuance.

Figure 7:
FIG. 7 illustrates an exemplary user interface that lists the financial cards associated with a particular consumer's card registry account, and provides controls that allow the consumer to select one or more of the financial cards for cancellation and possible reissuance.

FIG. 7 illustrates an exemplary user interface 700 that lists the financial cards associated with a particular consumer card registry account, and provides controls that allow the consumer to select one or more of the financial cards for cancellation and possible reissuance. In the embodiment of FIG. 7, in addition to listing the same information regarding the financial cards as on the user interface 600 (FIG. 6), the user interface 700 also includes a cancel card column 710 and a reissue card column 720, each of the columns comprising selectable controls (e.g., checkboxes) that are selectable by the consumer in order to indicate the cards the consumer is interested in canceling and reissuing. In this embodiment, each of the cancel and re-issue columns 710, 720 includes a select all checkbox 730 that may be selected by the consumer in order to mark each of the checkboxes in the respective column as selected. In one embodiment, the user interface 700 defaults to selecting the cancel card checkbox for each of the listed financial cards, while in other embodiments the user interface 700 defaults to selecting none of the cancel card checkboxes for the listed financial cards.

In the particular embodiment of FIG. 7, the consumer has selected each of the four cards 740A, 740B, 740C, and 740D for cancellation. The consumer has selected only the financial card 740A and 740C for reissuance. Thus, the card registry system 150, and more specifically the account cancellation/reissuance module 260, will initiate cancellation of each of the listed financial cards 740, and will additionally initiate reissuance of financial cards 740A and 740C. In the embodiment of FIG. 7, the consumer confirms the cancellation and reissuance instructions that are indicated by selection of appropriate checkboxes in columns 710, 720, by selecting the cancel my cards button 740. In response to selecting button 740, the card registry system initiates cancellation and reissuance of the financial cards as indicated by the consumer in user interface 700, for example.

As noted above, the steps taken in initiating cancellation and reissuance of financial cards may vary between different consumers, card issuers, and embodiments of the card registry system 150. For example, in one embodiment the account cancellation/reissuance module 260 may automatically send electronic cancellation and reissuance requests to the card issuers of the respective credit cards that have been selected for cancellation and reissue. In another embodiment, a customer service representative may receive a report indicating one or more financial cards that the consumer would like to cancel, and zero or more cards that the consumer would like to be reissued. For example, in response to the consumer selecting the button 740 such a report may be generated and provided to a customer service representative in order to allow the customer service representative to initiate the indicated cancellations and reissuances by contacting the corresponding financial card issuers, such as by telephone, fax, e-mail, or any other suitable communication with the respective card issuers.

Figure 8:
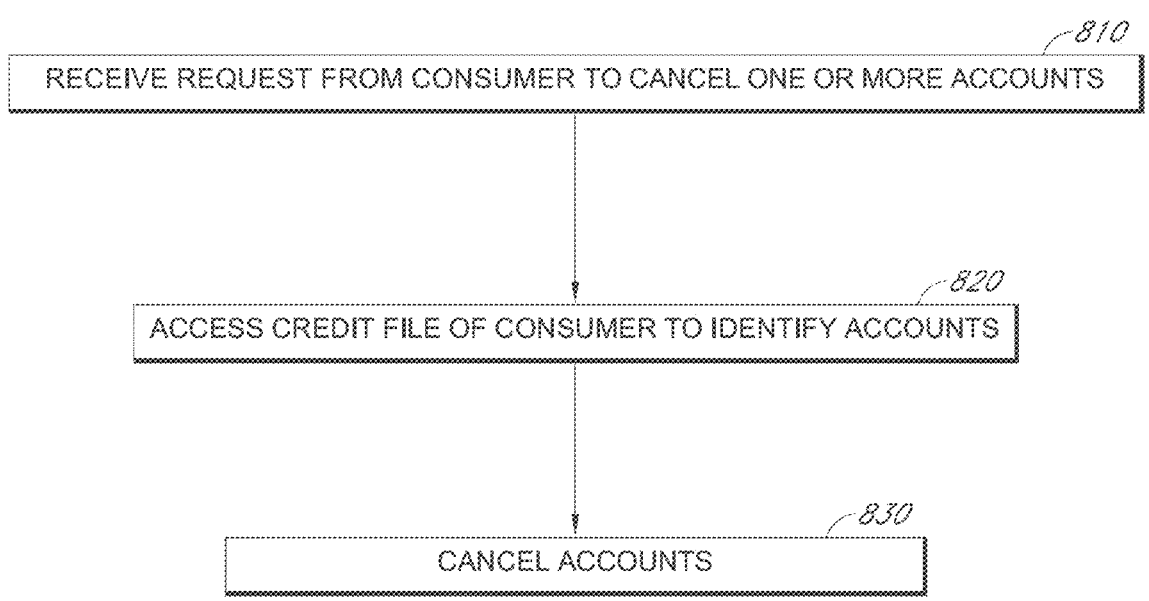
FIG. 8 is a flowchart illustrating one embodiment of a method of canceling financial cards of a consumer.

FIG. 8 is a flowchart illustrating one embodiment of a method of canceling financial cards of a consumer. The blocks of FIG. 8 may be performed by the card registry system 150, for example, or any other suitable computing device. Depending on the embodiment, the method of FIG. 8 may include fewer or additional blocks and blocks may be performed in a different order than is illustrated.

Beginning in block 810, the card registry system 150 receives a request from a consumer to cancel one or more financial cards. In one embodiment, the consumer is already registered with another service offered by the card registry provider. For example, the consumer may be enrolled in a credit monitoring service that is provided by the provider of the card registry service. In another embodiment, the consumer may not be enrolled in another service offered by the card registry provider, and may be required to enroll in such a service in block 810, or provide sufficient identification and authorization information to the card registry system 150 in order to allow the card registry system 152 access the consumer's credit file.

Next, in block 820 the credit file of the consumer is accessed and credit cards associated with the consumer are identified on the credit file. The information regarding the identified credit cards may be extracted and stored in a card registry account for the consumer. In one embodiment, the extraction of credit card information from a credit file of the consumer occurs in response to the consumer indicating their desire to cancel one or more financial cards. In another embodiment, the identification of credit card information in a credit file is performed prior to receiving an indication from the consumer of a desire to cancel one or more financial cards, such as part of a normal credit monitoring service.

Next, in block 830 cancellation of one or more of the credit cards identified in the consumer credit file is initiated. As discussed above, the consumer may be given an opportunity to select which cards of the identified credit cards should be canceled, such as via a web accessible user interface or a telephone call with a customer service representative. Additionally, the consumer may be provided an opportunity to select one or more of the credit cards for reissuance after the respective credit cards are canceled. In one embodiment, the card registry system 150 automates the cancellation and reissuance process by communicating directly with the corresponding card issuers.

In the embodiments described above with reference to FIGS. 6-8, for example, the identification and cancellation of multiple credit cards associates with a consumer may be quickly and accurately performed. Additionally, the consumer is not required to locate credit card information in their personal files in order to initiate cancellation of their credit cards.

Figure 9:
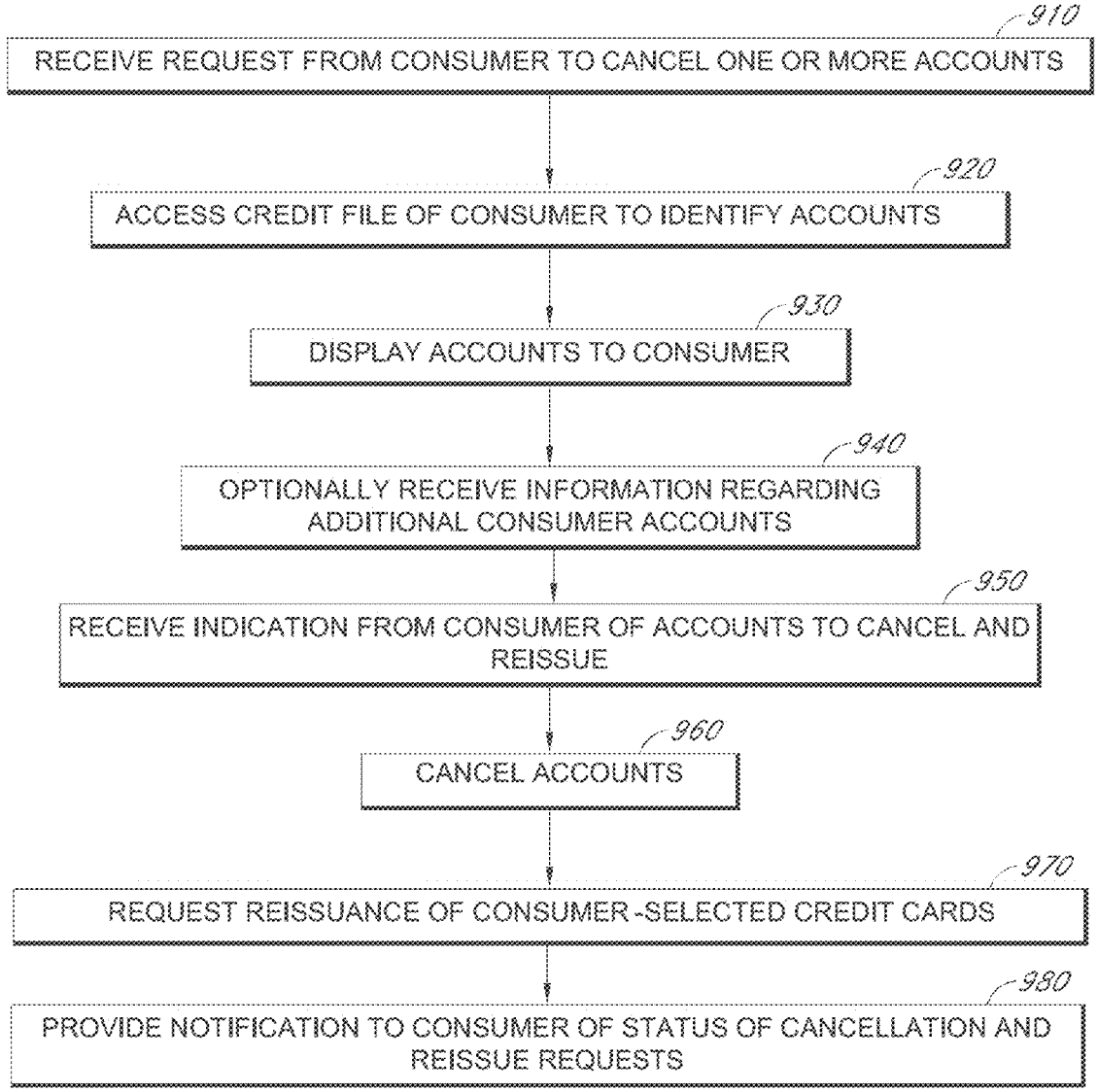
FIG. 9 is a flowchart illustrating another embodiment of a method of canceling financial cards of a consumer.

FIG. 9 is a flowchart illustrating another embodiment of a method of canceling financial cards of a consumer. The blocks of FIG. 9 may be performed by the card registry system 150, for example, or any other suitable computing device. Depending on embodiment, the method of FIG. 9 may include fewer or additional blocks and blocks may be performed in a different order than is illustrated.

Beginning in block 910, the card registry system 150 receives a request from a consumer to cancel one or more financial cards. As noted above, the request may come from a consumer that is already enrolled in a financial service offered by the same entity that controls the card registry system 150, or the request may be received from a consumer that is not enrolled in such a service.

Next, in block 920 a credit file of the consumer is accessed and one or more credit card accounts, and possibly other types of accounts, are identified in the credit file.

In block 930, the identified credit card accounts are displayed to the consumer, such as in a web accessible user interface. In other embodiments, the located accounts may be displayed to a customer service representative that is speaking to the consumer on the phone, for example.

Continuing to block 940, the card registry system 150 optionally receives information regarding additional consumer accounts, such as debit accounts, store loyalty accounts, ATM accounts, or any other account that the consumer may be interested in canceling. Information regarding the additional consumer accounts may be received via a web accessible user interface, for example, or may be entered into a standalone software application by a customer service representative or by the consumer.

In block 950, the card registry system 150 receives indications from the consumer of accounts to cancel and reissue. For example, the user may select one or more of the identified and/or manually added financial cards for cancellation via a web accessible user interface (see, e.g., FIG. 7). Additionally, the user may also indicate which of the accounts selected for cancellation should be reissued to the consumer.

Next, in block 960, the card registry system 150 initiates cancellation of the selected accounts. As noted above, cancellation may be initiated in various manners, such as electronically by a communication sent from the card registry system 150 to respective issuers, phone, fax, or e-mail communications between a customer service representative and the respective card issuers, or any other suitable method of communicating a cancellation request to the respective issuers.

In block 970 the card registry system 150 requests reissuance of consumer selected credit cards, if any. As noted above, the consumer may wish to have one or more of his/her soon-to-be-canceled credit cards immediately reissued. Thus, the card registry system 150 may automate the process of requesting reissuance of financial cards. Issuance of credit cards or other financial cards may be initiated in various manners, such as electronically by a communication sent from the card registry system 150 to respective issuers, phone, fax, or e-mail communications between a customer service representative and the respective card issuers, or any other suitable method of communicating a reissuance request to the respective issuers.

In block 980, the card registry system provides notification to the consumer of the status of the selected cancellation and reissuance requests. In one embodiment, the card registry system 150 provides a substantially real-time indication to the consumer of the status of the consumer's cancellation and reissuance requests, such as via a web interface that is provided to the consumer with a few seconds to a few minutes after the consumer authorizes the cancellation of the cards. The time required for cancellation and reissuance of financial cards may vary depending on several factors, including the respective card issuer, the time of day the cancellation or reissuance request is received, the type of financial card, and/or the manner in which the cancellation or reissuance request is transmitted to the respective issuer. Thus, in one embodiment of the card registry system 150 provides periodic updates, such as every 10 minutes, 20 minutes, 30 minutes, hour, day, or other time, to the consumer with updated information on each of the cancellation and reissuance requests. The notification may be provided in any suitable format, such as via a user interface of a credit monitoring website or card registry website, e-mail, text message, voicemail, or regular mail, for example.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
   generating a user interface that includes a selectable option for a user to access a service configured to search one or more data sources for financial accounts of a user that are not identified in a credit file of the user;
   receiving an indication of a user selection of the selectable option;
   subsequent to receiving the indication of the user selection, accessing information associated with the user from a source other than the credit file of the user;
   parsing or scanning the information from the source other than the credit file to identify at least a first account of the user that is identified in the information from the source other than the credit file but is not included in the credit file of the user; and
   initiating addition of the first account to a database of a credit bureau.

2. The computer-implemented method of claim 1 further comprising:
   providing a user interface that includes another selectable option to add the first account of the user to the database of the credit bureau; and
   receiving a user input of a user selection of the other selectable option via the user interface, wherein initiating the addition is based on the received user input.

3. The computer-implemented method of claim 1, wherein the selectable option relates to a monitoring service for monitoring debit accounts.

4. The computer-implemented method of claim 3, wherein the monitoring service is configured to monitor a debit account from a source other than a credit file.

5. The computer-implemented method of claim 1, wherein the first account corresponds to a retail store.

6. The computer-implemented method of claim 1, wherein the first account is a financial account of a type other than a credit card.

7. The computer-implemented method of claim 1 further comprising:
   tracking a status of adding the first account to the database of the credit bureau; and
   providing, to the user, the status of adding the first account.

8. The computer-implemented method of claim 1, wherein adding the first account to the database of the credit bureau comprises adding the first account to the credit file for the user in the database of the credit bureau.

9. A system comprising:
   memory; and
   one or more hardware processors configured to:
      generate a user interface that includes a selectable option for a user to access a service configured to search one or more data sources for financial accounts of a user that are not identified in a credit file of the user;
      receive an indication of a user selection of the selectable option;
      subsequent to receiving the indication of the user selection, access information associated with the user from a source other than the credit file of the user;
      determine at least a first account of the user that is identified in the information from the source other than the credit file but is not included in the credit file of the user; and
      initiate addition of the first account to a database of a credit bureau.

10. The system of claim 9, wherein the selectable option relates to a monitoring service for monitoring debit accounts.

11. The system of claim 10, wherein the monitoring service is configured to monitor a debit account from a source other than a credit file.

12. The system of claim 9, wherein the first account corresponds to a retail store.

13. The system of claim 9, wherein the first account is a financial account of a type other than a credit card.

14. The system of claim 9, wherein the one or more hardware processors are further configured to:
   track a status of adding the first account to the database of the credit bureau; and
   provide, to the user, the status of adding the first account.

15. The system of claim 9, wherein adding the first account to the database of the credit bureau comprises adding the first account to the credit file for the user in the database of the credit bureau.

16. The system of claim 9, wherein the one or more hardware processors are further configured to periodically monitor the information associated with the user from a source other than the credit file of the user to identify additional accounts of the user.

17. The system of claim 16, wherein periodically monitoring the information comprises at least one of scanning or parsing the information to identify at least one account.

18. A non-transitory computer storage medium storing computer-executable instructions that, when executed by a processor, cause the processor to perform operations comprising at least:
   generating a user interface that includes a selectable option for a user to access a service configured to search one or more data sources for financial accounts of a user that are not identified in a credit file of the user;

receiving an indication of a user selection of the selectable option;

subsequent to receiving the indication of the user selection, accessing information associated with the user from a source other than the credit file of the user;

determining at least a first account of the user that is identified in the information from the source other than the credit file but is not included in the credit file of the user; and initiating addition of the first account to a database of a credit bureau.

19. The non-transitory computer storage medium of claim 18, wherein the operations further comprise periodically monitoring the information associated with the user from a source other than the credit file of the user to identify additional accounts of the user.

* * * * *